United States Patent
Boozer et al.

(10) Patent No.: US 7,370,344 B2
(45) Date of Patent: May 6, 2008

(54) COMPUTER-IMPLEMENTED DATA ACCESS SECURITY SYSTEM AND METHOD

(75) Inventors: John Forrest Boozer, Cary, NC (US); Craig Rubendall, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 671 days.

(21) Appl. No.: 10/413,452

(22) Filed: Apr. 14, 2003

(65) Prior Publication Data

US 2004/0205355 A1 Oct. 14, 2004

(51) Int. Cl.
*G06F 7/04* (2006.01)

(52) U.S. Cl. ............................................. 726/2

(58) Field of Classification Search ............... 713/167, 713/165, 166; 726/2, 26, 27
See application file for complete search history.

(56) References Cited

U.S. PATENT DOCUMENTS

| | | | | |
|---|---|---|---|---|
| 6,941,472 | B2 * | 9/2005 | Moriconi et al. | 726/11 |
| 6,976,090 | B2 * | 12/2005 | Ben-Shaul et al. | 709/246 |
| 7,185,192 | B1 * | 2/2007 | Kahn | 713/155 |

* cited by examiner

*Primary Examiner*—Ellen Tran
(74) *Attorney, Agent, or Firm*—Jones Day

(57) ABSTRACT

A computer-implemented system and method for accessing resource objects wherein the objects have multiple associations and/or parents. Security rules indicate which associations and/or parents of a requested resource object are to be used in determining whether to grant access to the requested resource object.

41 Claims, 19 Drawing Sheets

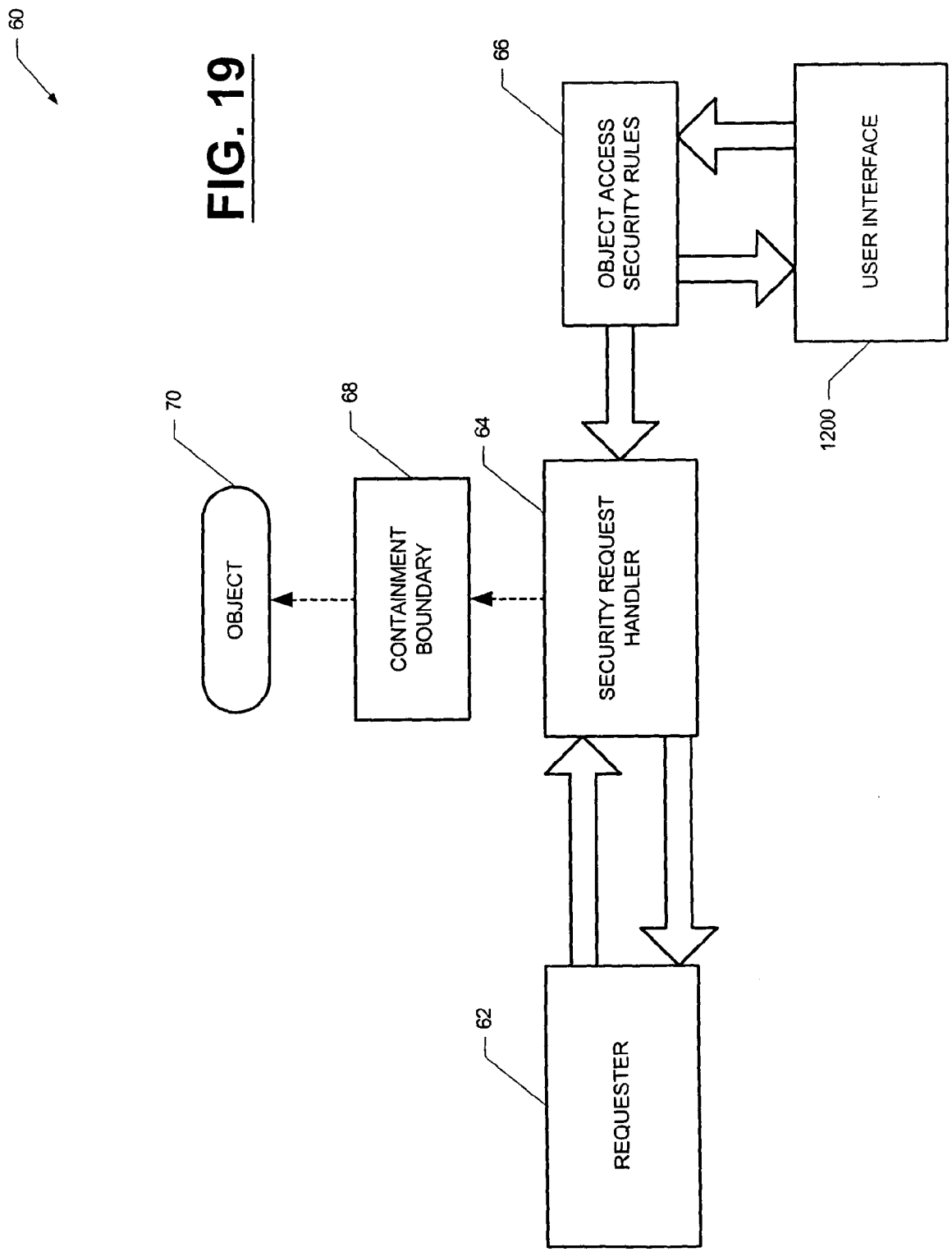

COMPUTER-IMPLEMENTED DATA ACCESS SECURITY SYSTEM AND METHOD

TECHNICAL FIELD

The present invention relates generally to computer-implemented data access methods and systems and more particularly to data access security mechanisms.

BACKGROUND

Many computer systems have to cope with a diverse set of users requesting access to resources stored within the systems. An example of users requesting access involves requests to access a directory-based file system. In this situation, access may be determined by defining access boundaries through analysis of a straightforward hierarchical convention involving the resource.

As an illustration, FIG. 1 depicts a directory-based file system having a straightforward hierarchical convention 30 wherein its items have one parent. The top-level directory "C:\" 32 occupies the top position in the directory hierarchy and is a hierarchical parent of the subdirectories "MYDIR" and "PUBLIC" (34 and 36). Subdirectory MYDIR 34 is itself a parent of the "TEST1.XLS" file 38. Subdirectory PUBLIC 36 is a parent of the "TEST2.XLS" file 40 and "TEST3.XLS" file 42. This type of directory hierarchical structure allows for relatively straightforward security access due in part to the single parent nature of the items in the hierarchy. However, security access issues substantially increase in difficulty when a computer system involves more complex items and relationships.

SUMMARY

In accordance with the teachings provided herein, a system and method are provided for accessing resource objects wherein the objects have multiple associations and/or parents. Security rules indicate which associations and/or parents of a requested resource object are to be used in determining whether to grant access to the requested resource object.

BRIEF DESCRIPTION OF THE DRAWINGS

FIG. 19 is a block diagram depicting a user interface having a data connection to a data access security system.

DETAILED DESCRIPTION

Figure 1:
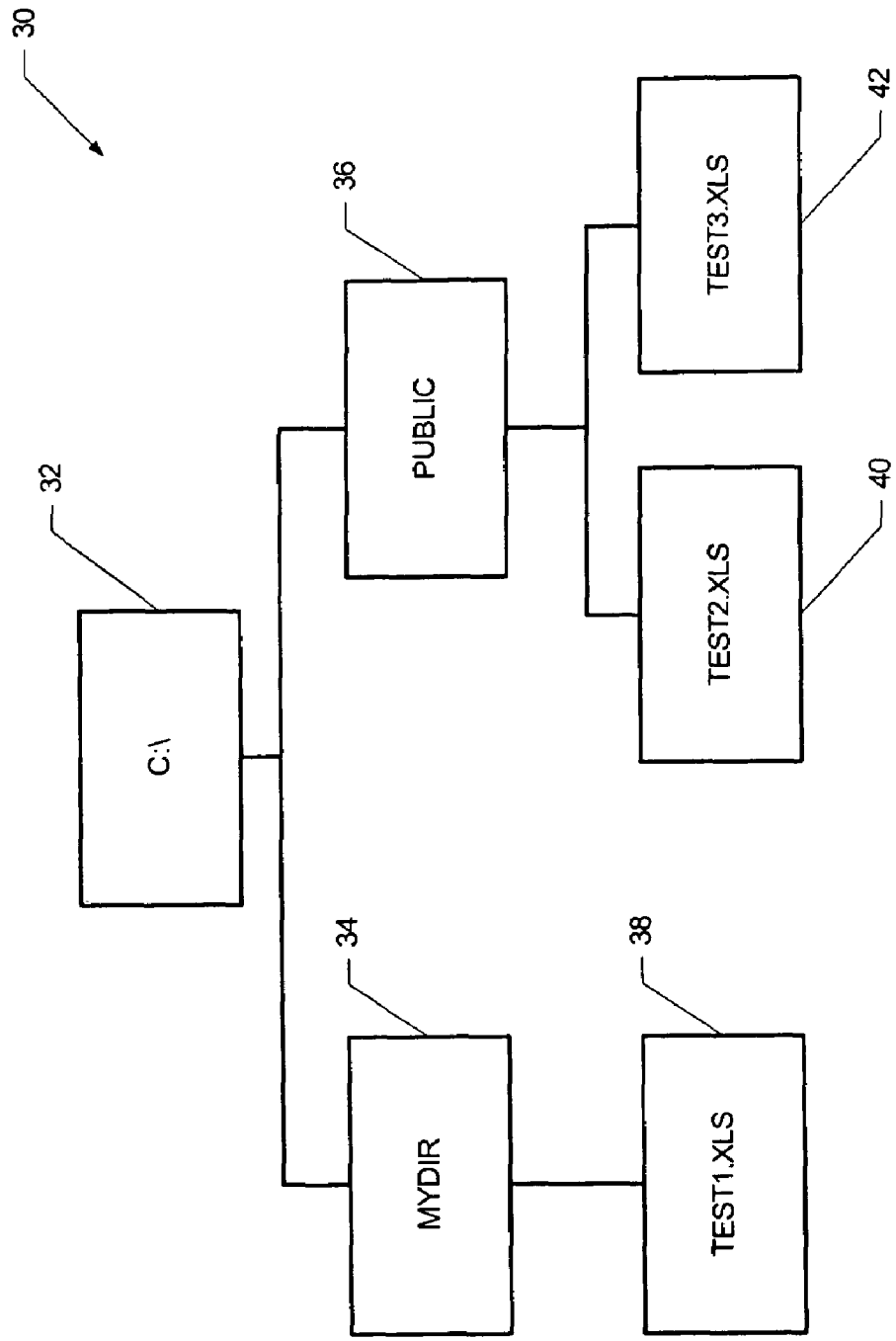
FIG. 1 depicts a hierarchical convention used with directory-based file systems.
Figure 2:
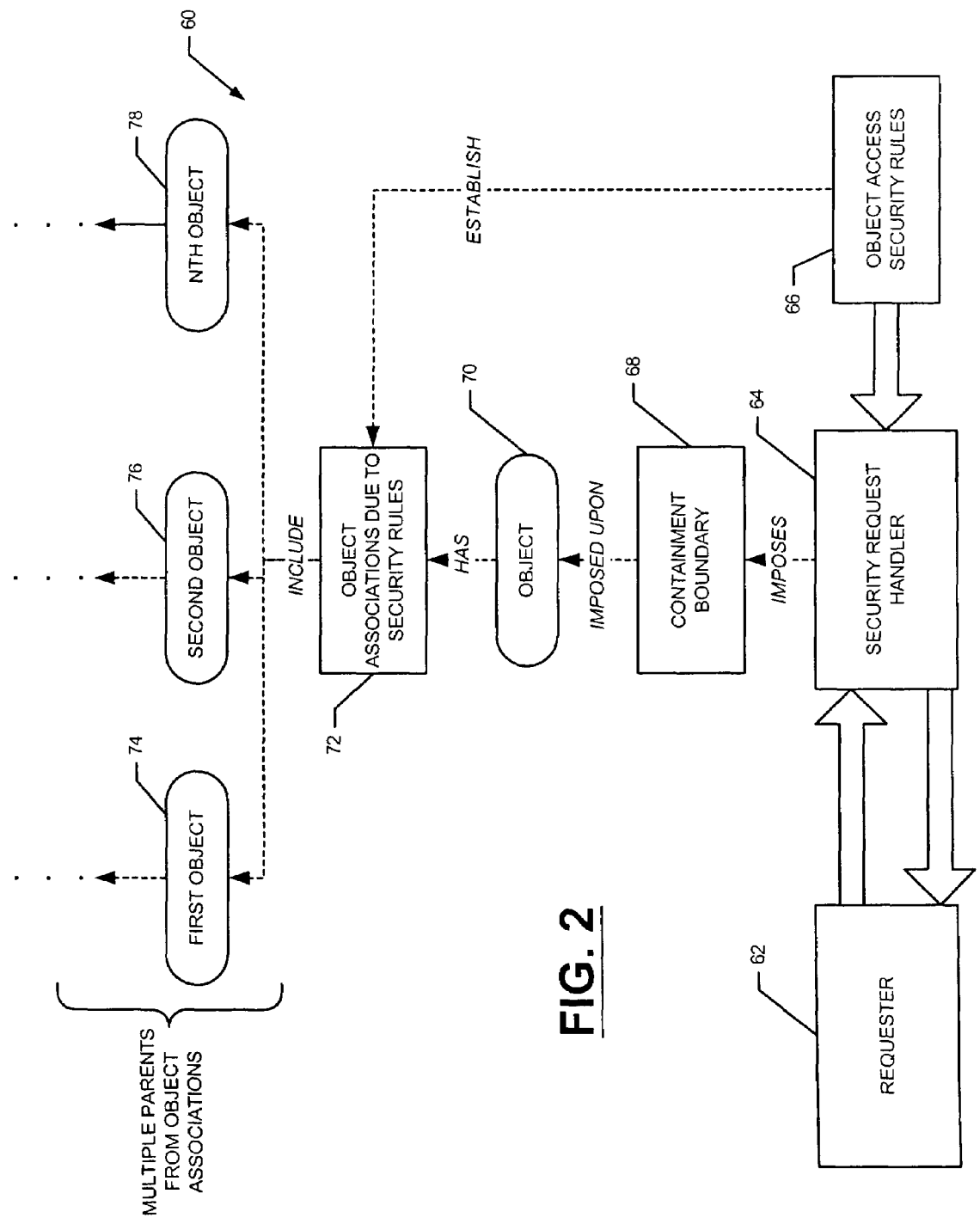
FIG. 2 depicts a block diagram of computer and software components utilized in a data access security system.

FIG. 2 depicts a data access security system 60 for accessing information stored within a data storage unit or units. The stored information is retrieved through resource objects (70, 74, 76, 78) which are interconnected through a complex set of relationships or associations 72. Associations 72 define conceptual relationships between an instance of one class and an instance of another class. For example, objects may be associated to higher level container objects, such as a column object having an association to the table within which it is found as well as to other objects. The table object may itself have multiple associations, such as to libraries and trees within which it is located. In this respect, an object 70 may have associations 72 to multiple objects (74, 76, 78).

A requester 62, such as a computer program or a person using a computer program, furnishes a request for information located in the database. A requester 62 may be asking for any type of information, such as information about company employee salaries or positions. A security request handler software module 64 receives the request and examines whether the requester 62 should be granted access to all or any of the requested information as well as what kinds of operations the requester 62 may perform on that information.

The security request handler 64 processes the request by constructing a containment boundary 68 around the object that is involved in the request. The containment boundary 68 determines objects that act as containers or parents and are used when evaluating who can have access to the object. Object security rules 66 help form the containment boundary 68 by specifying what object associations 72 are involved in constructing the containment boundary 68. Because, an object 70 may have multiple associated objects (74, 76, 78), object access security rules 66 specify which object associations 72 are to be used in constructing the containment boundary 68. Because, an object 70 may have multiple associated objects (74, 76, 78), the object may have multiple security parents. The object may have one or more parents through a class inheritance hierarchy whose security rules may be inherited by the object.

The object access security rules 66 may also specify that certain conditions should be considered in determining which requesters can permeate the containment boundary 68. As an illustration, containment boundaries may be established for objects by setting up object access security rules based on object class that describe how to traverse from an object of a class to the related object with which it is associated. The security information that is obtained from traversing among objects according to the object access security rules is used to determine whether the requester 62 should be granted access. Accordingly, security rules 66 act as containment rules in determining which objects (e.g., 74, 76, 78) are contained within the containment boundary based upon the requested object 70; and then security rules 66 (associated with the objects (e.g., 70, 74, 76, 78) that are contained within the containment boundary 68) specify whether access should be granted.

Figure 3:
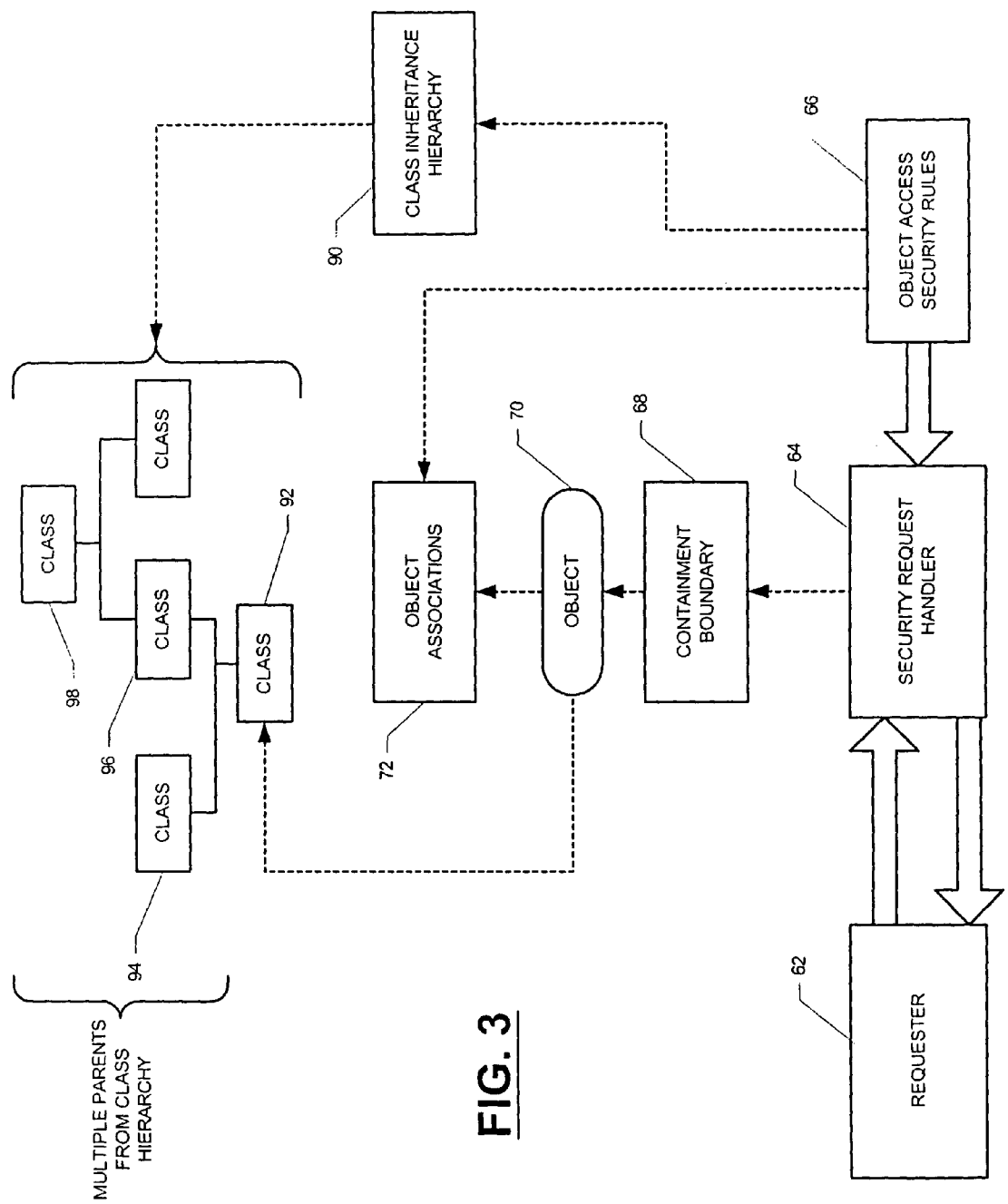
FIG. 3 depicts a block diagram wherein object class structure is utilized within a data access security system.

In addition to looking up rules that are tied to class associations, the security request handler 64 may also examine (as shown in FIG. 3) security rules 66 inherited from the objects' ancestor classes in the class inheritance hierarchy 90. Based upon the hierarchy 90, child objects (e.g., 70)

know from what parent object(s) they are to inherit. For example, child object 70 from class 92 inherits from parent classes 94, 96, and 98. (It should be understood that many different class inheritance hierarchies may be used.) The security request handler 64 is capable of evaluating the inheritance rules and aggregating security information through the inheritance hierarchy 90 to make an authorization decision. A set of rules 66 can be defined once on a parent class and affect all of its child classes. Optionally, child classes can augment inherited security or choose to ignore one or more of the inheritable rules from ancestor classes.

With such an approach, containment boundaries are constructed by setting up a series of rules 66, based upon class, that describe how to traverse from an object of that class to a related object from which it should acquire its security, as well as (if desired) based upon inheriting rules from ancestor classes in a class hierarchy tree.

Figure 4:
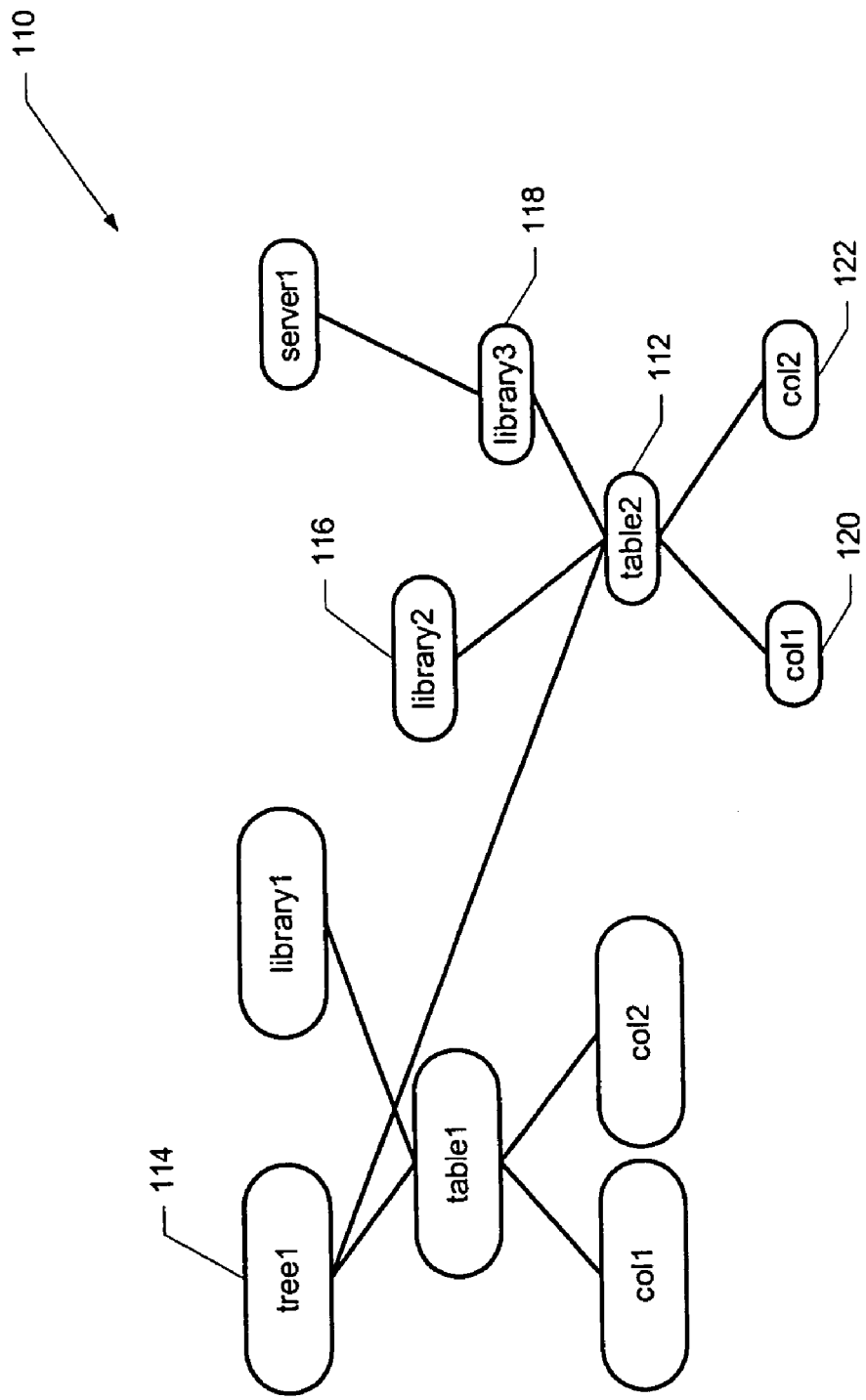
FIG. 4 is an object relationship diagram depicting relationships among multiple objects.

To further illustrate the range of associations with which objects can become involved, FIG. 4 depicts at 110 objects with lines between them that represent object associations. For example, the object "table2" 112 has associations with objects "tree1" 114, "library2" 116, "library3" 118, "col1" 120, and "col2" 122. FIG. 4 also visually demonstrates that such networks of associations do not easily (if at all) form a top-down hierarchy. This weblike network of relationships may arise for many reasons, such as to allow objects to relate to one another in flexible and dynamic ways. There are many paths to and from objects, unlike those in a hierarchical organization.

Figure 5:
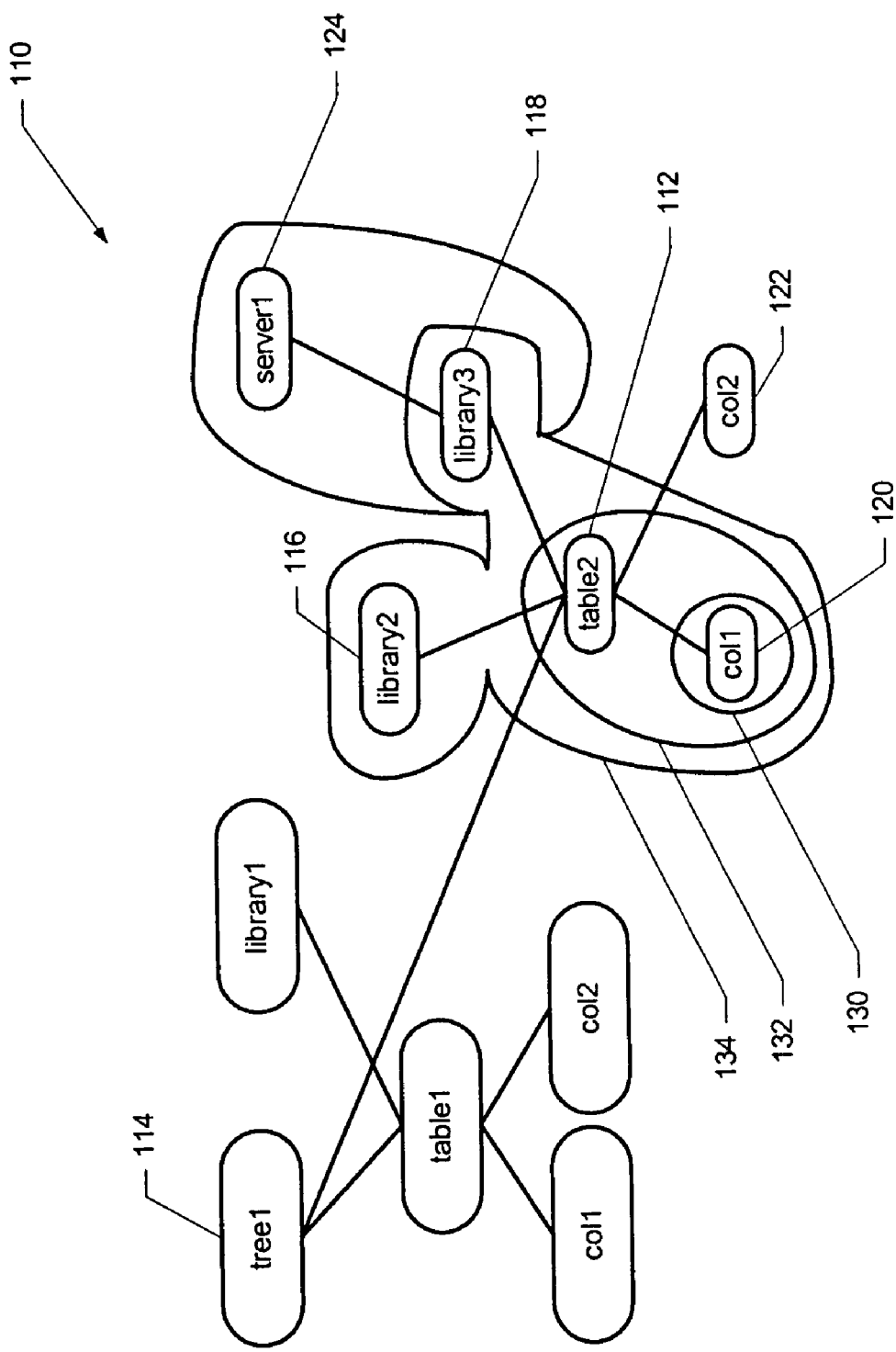
FIG. 5 is an object relationship diagram depicting a containment boundary being imposed by a data access security system.

As shown in FIG. 5, the data access security system can project one or more containment boundaries onto the object relationships. The access control decision for a given object may be determined at least in part upon its association with one or more related objects. Thus, a table (e.g., table2 112) might acquire its security from its associated libraries (e.g., library2 116 and library3 118); a column (e.g., col1 120) might acquire its security from its associated table (112); and a library (e.g., library3 118) could acquire its security from its servers (e.g., server1 124).

Based upon an object's physical container and class type, security containment rules can specify different layers of containment. As an illustration, a containment boundary 130 has been projected at the granular level of the col1 object level. A higher level containment boundary 132 has been imposed collectively about the table2 and col1 objects (112, 120), as well as another boundary 134 about the objects library2, library3, table2, and col1 (116, 118, 112, 120). The containment boundaries (130, 132, 134) define who can have access and optionally what operations they may perform upon the objects. The containment layers may be imposed in an outward fashion in that a containment boundary 130 may be first imposed with respect to the requested object 120 (e.g., the object which is the subject of the request). As the security rules are processed, containment boundary 132 is imposed with respect to both objects 120 and 112, and then containment boundary 134 is imposed with respect to objects 120, 112, 116, and 118.

Figure 6:
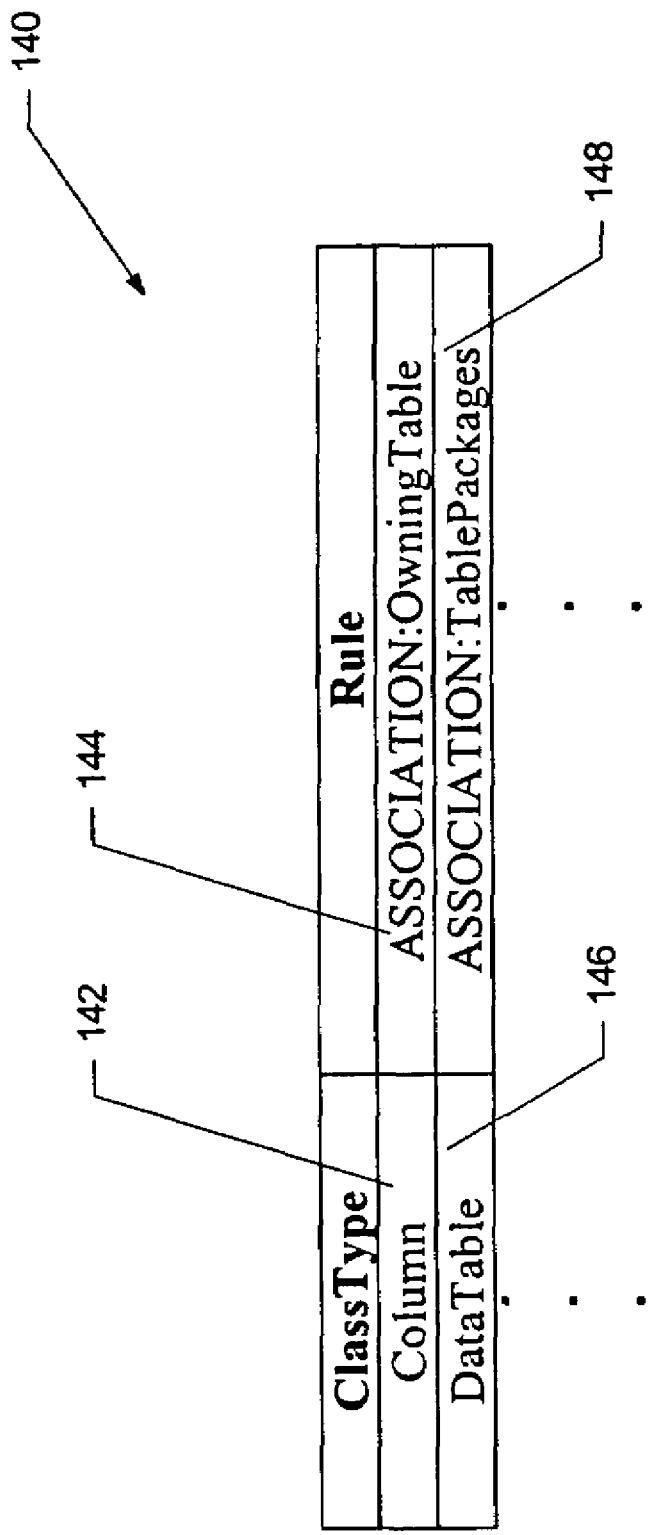
FIGS. 6-8 are exemplary tables of rules utilized by a data access security system.
Figure 7:
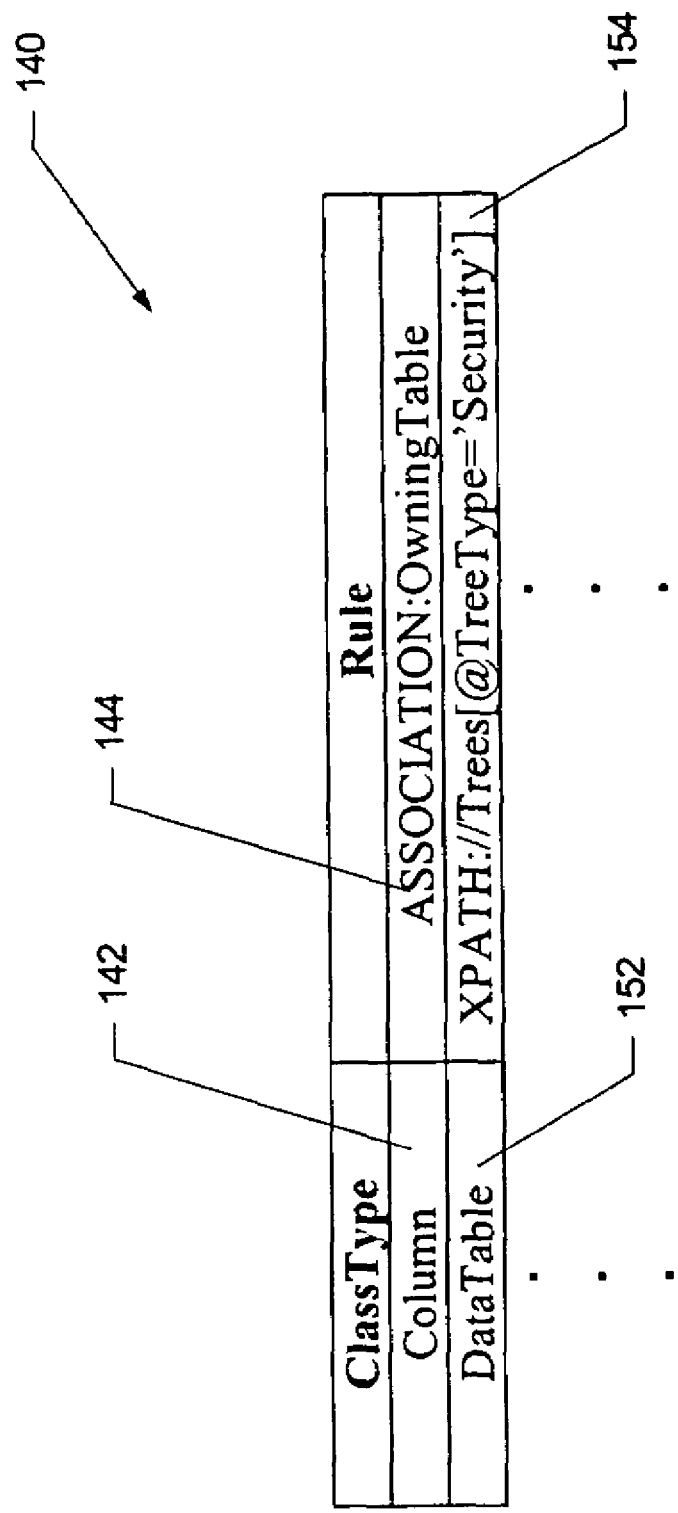
Figure 8:
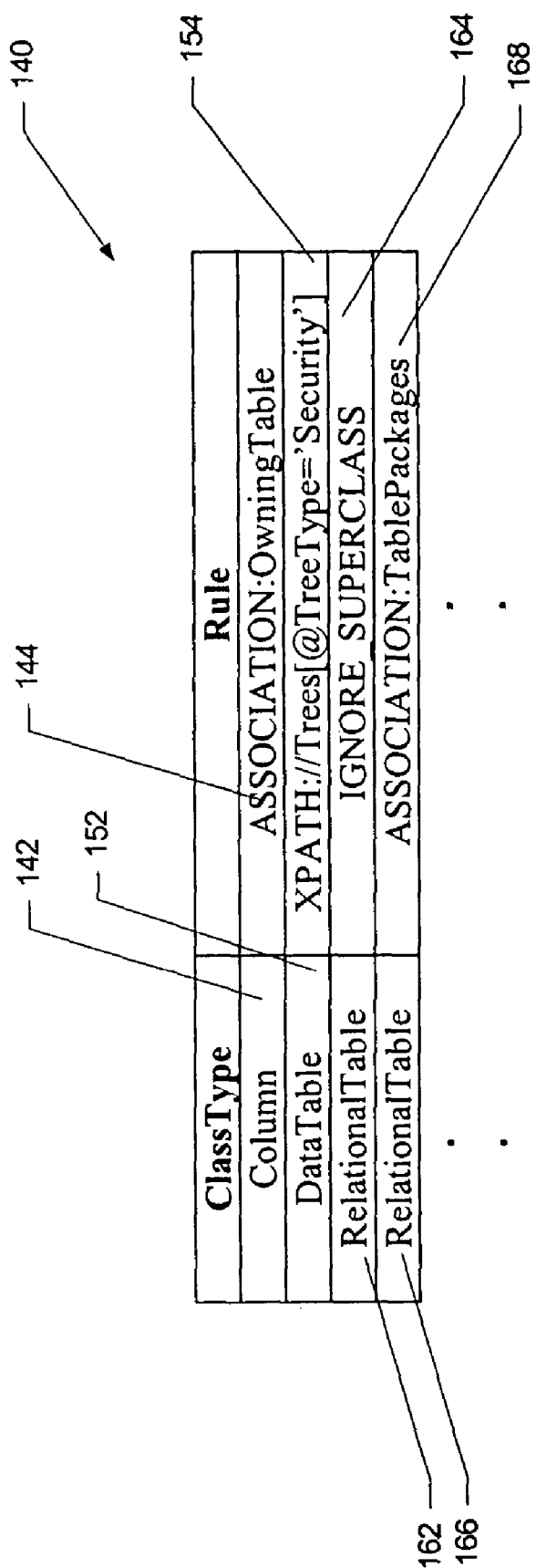

To impose containment boundaries, the security rules may take many different forms. An example is shown in FIGS. 6-8. FIG. 6 shows a table 140 which maps security rules to class types. With reference to FIG. 6, column instances 142 acquire their security from the object that is retrieved via its "OwningTable" association as specified by rule 144. A DataTable object (of class type DataTable 146) would acquire its security from the object that is retrieved via its "TablePackages" association as specified by rule 148.

FIG. 7 shows an example where a DataTable object (of class type DataTable 152) inherits its security from the objects that are retrieved via the Trees association and that match the condition of its TreeType attribute equaling 'Security' as specified by rule 154.

FIG. 8 shows another example where rules for the RelationalTable class have been added as indicated at 162 and 164. In this example, the RelationalTable class is a subclass of DataTable. If the rules from the example of FIG. 7 were used, a RelationalTable object would acquire its security using the DataTable rules (e.g., rule 154). With reference back to FIG. 8, if the "IGNORE_SUPERCLASS" rule 164 were to be ignored, then a RelationalTable object would inherit security from both the DataTable rule (e.g., rule 154) and the RelationalTable rule 168. By adding in this example the "IGNORE_SUPERCLASS" rule 164, the security rules are limited to those directly associated to the RelationalTable class.

Figure 9:
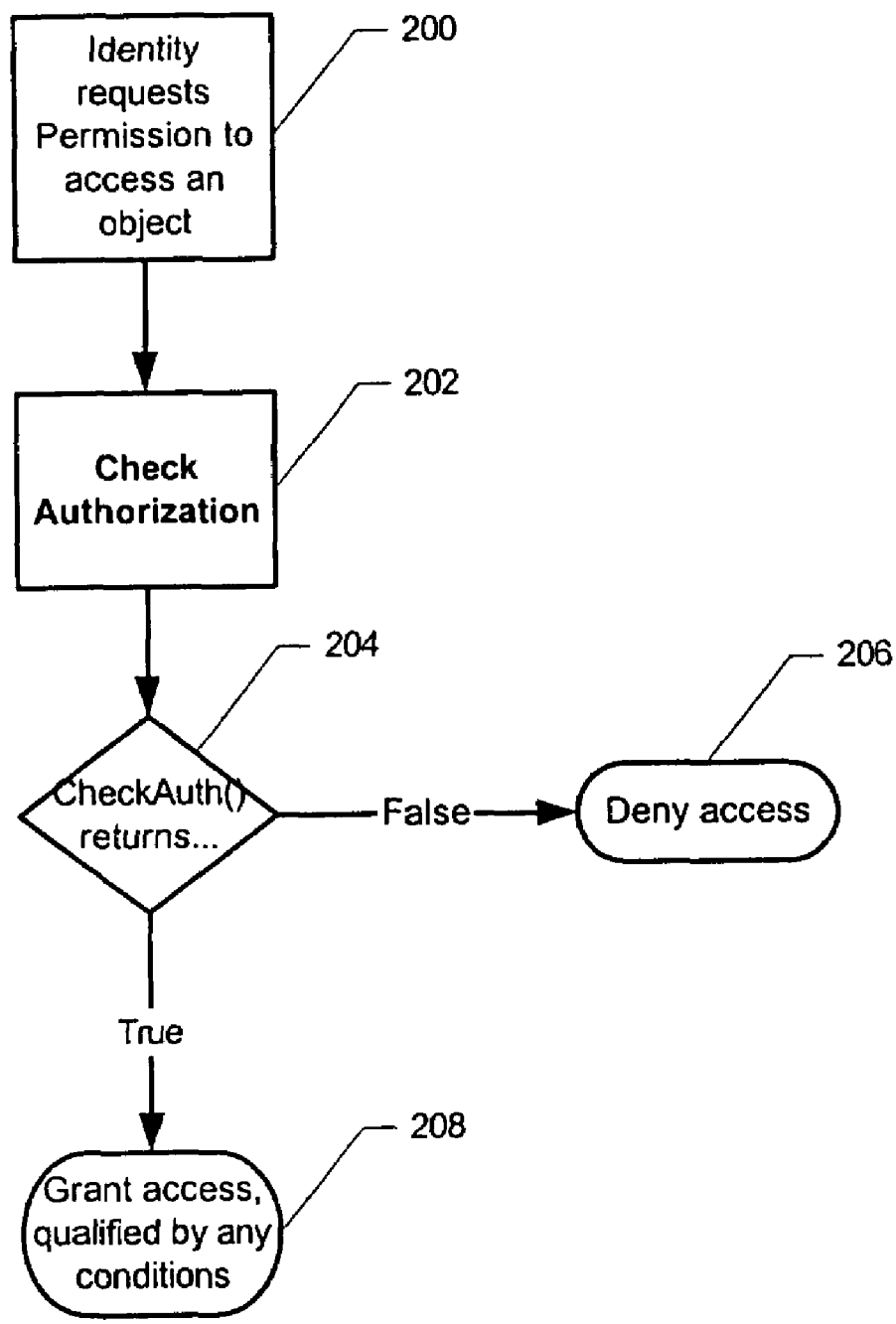
FIGS. 9-14 are flow charts depicting an example of an operational scenario involving a data access security system.

FIGS. 9-14 are flow charts depicting an example of an operational scenario involving a data access security system. With reference to FIG. 9, an identity (e.g., a requester) requests permission (i.e., the type of access requested to the resource) to access an object at process 200. Process 202 examines whether the identity should be granted permission. If decision process 204 determines that the identity should not be granted access based upon the examination performed by process 202, then an indication is provided that access should be denied before processing terminates at termination block 206. However if decision process 204 determines that the identity should be granted access, then an indication is provided that access should be granted before processing terminates at termination block 208.

This scenario's processing involves authorization checking at process 202 for an identity. An authorization checking process involving an identity and object access security rules may be performed in many different ways. An example of an approach involves creating access control objects which specify whether the system should grant or deny one or more identities access to a specific requested object. Access control objects can also be used to specify what kinds of activities an identity can perform on the requested object. A security request handler checks if any access controls can be located that are directly attached to a requested object(s). If are any located, then the security request handler further checks whether any of these pertain to the current requester and to the permission they are seeking. If not, then the security request handler checks if there is a group with which the requester is associated or there is specific authorization for that requester that indicates a granting or a denial of access. If nothing is located in the search of the directly attached access controls, then the object access security rules for the requested object are examined. Optionally, the object access security rules may be placed in cache in order to quicken the rule examination process. The rules may also specify that superclass security aspects obtained from a class inheritance hierarchy need to be considered. This authorization checking approach is described in greater detail with respect to FIGS. 10-14.

Figure 10:
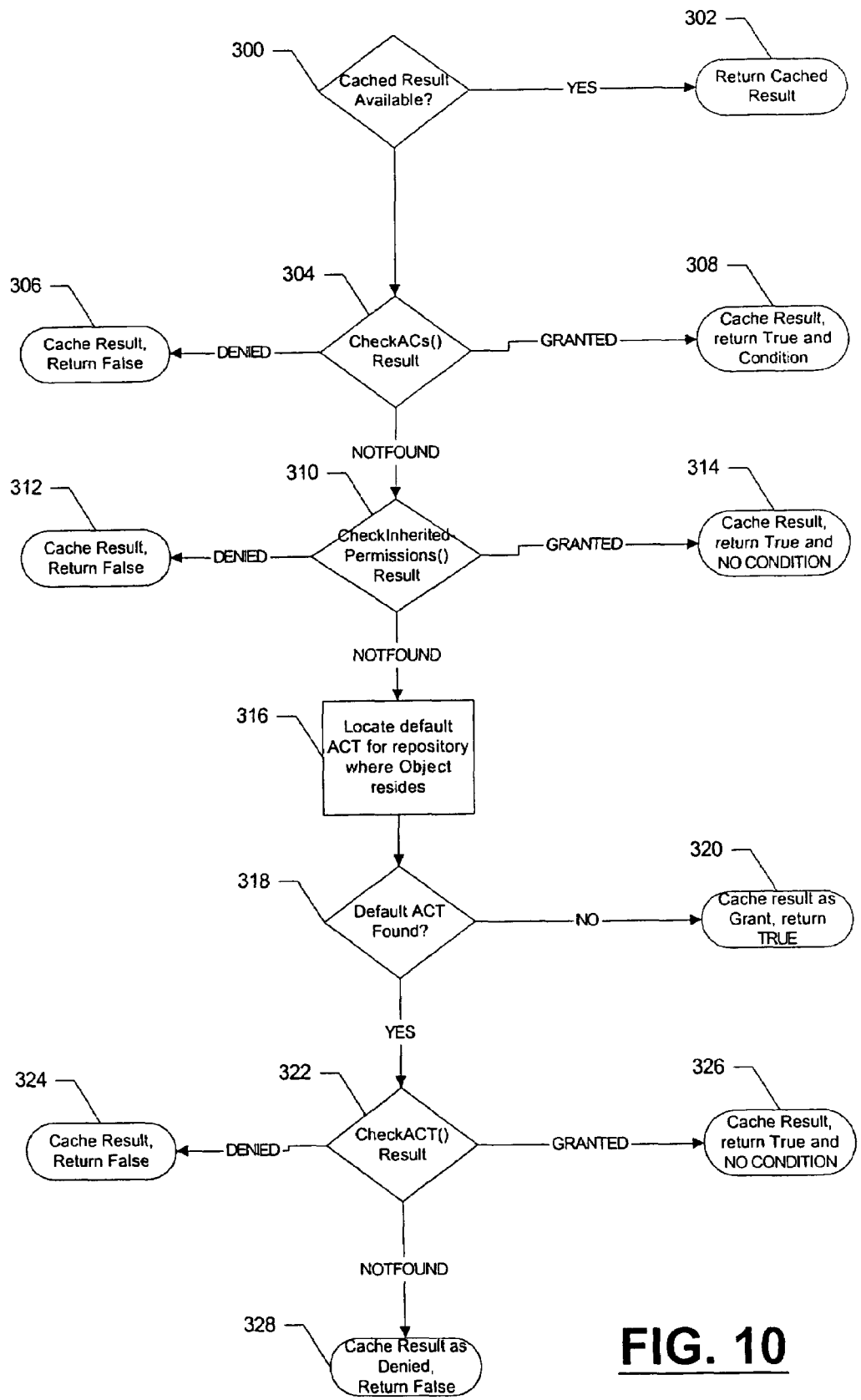

FIG. 10 depicts an operational scenario involving whether a user has a specified permission on a specific object. More specifically, this is related to the "CheckAuth( )" routine depicted as process 202 on FIG. 9.

With reference to FIG. 10, decision process 300 examines whether a cached result is available. If it is, then the cached result is returned as shown at 302. If the cached result is not available, then decision process 304 checks the result from the check access controls routine by examining the access controls that are directly associated with the object. (The access control routine is described in FIG. 11). If the routine returns a DENIED value, then at 306 the result is cached and a false value is returned. However, if the routine at decision process 304 indicates a GRANTED result, then at 308 the GRANTED result is cached and a true value as well as the condition is returned (e.g., a condition may specify that only the rows within a table that meet the condition may be accessed).

Figure 14:
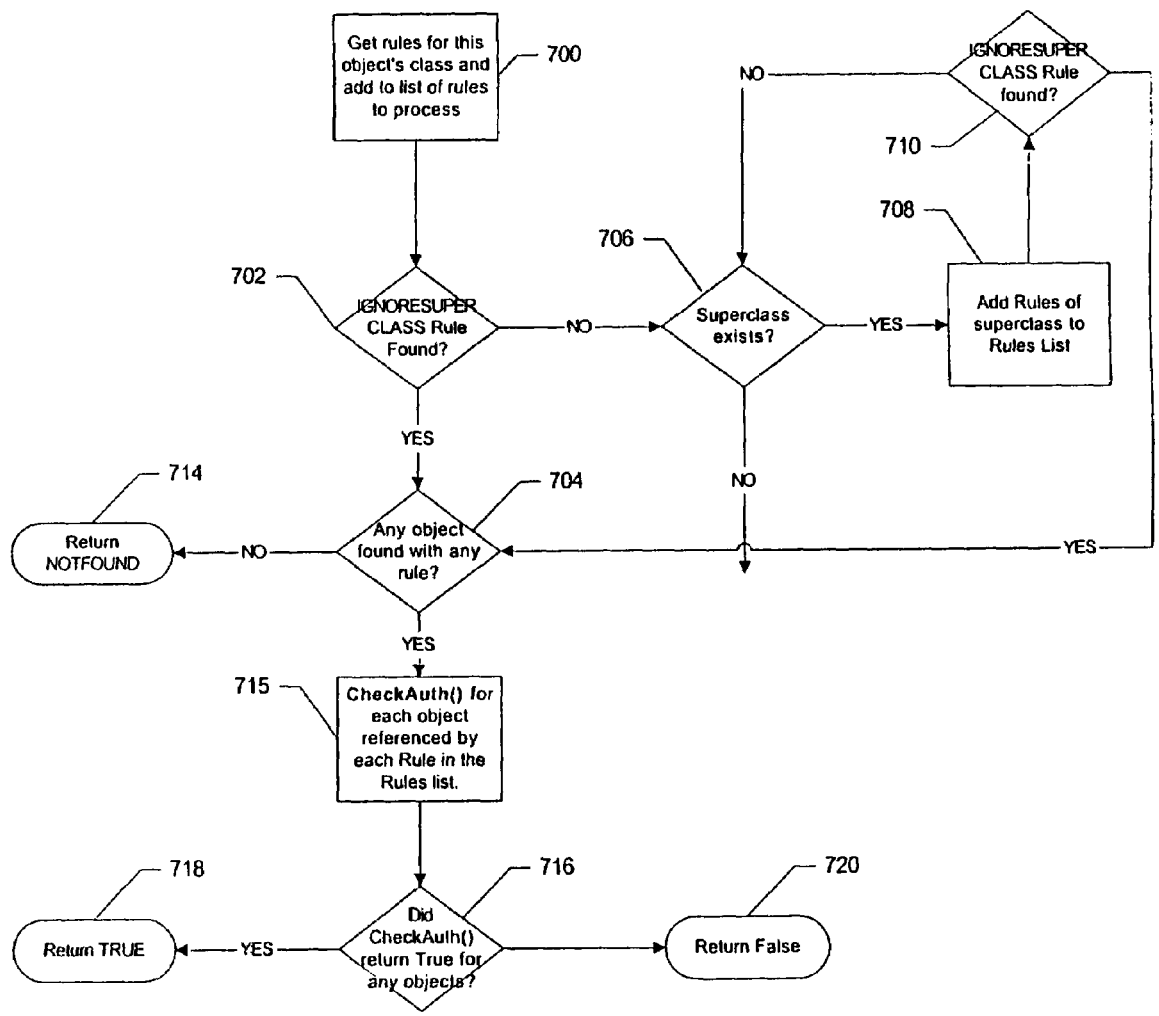

If the routine at decision process 304 returns a NOTFOUND result, then decision process 310 invokes the Check Inherited Permissions routine (which is described in FIG. 14). If the result from the routine is DENIED, then the result is cached and a false value is returned at 312. However, if the routine returns a GRANTED result, then at 314 the result is cached and a true value and NO CONDITION result is returned.

If the routine at decision process 310 returns a NOTFOUND result, then process 316 locates the default access control template for the repository where the resource object resides. Decision process 318 examines whether a default access control template was found. If not, then at 320 the result is cached as a GRANT permission and a true value is returned. If a default access control template was found as determined by decision process 318, then decision process 322 invokes the CheckACT routine (which is described in FIG. 13). If the result from the routine is a DENIED result, then the result is cached and a false value is returned at 324. However, if a GRANTED value is returned, then at 326 the result is cached and a true value and NO CONDITION result are returned. If the routine returns a NOTFOUND, then at 328 the result is cached as DENIED and returns a false value.

Figure 11:
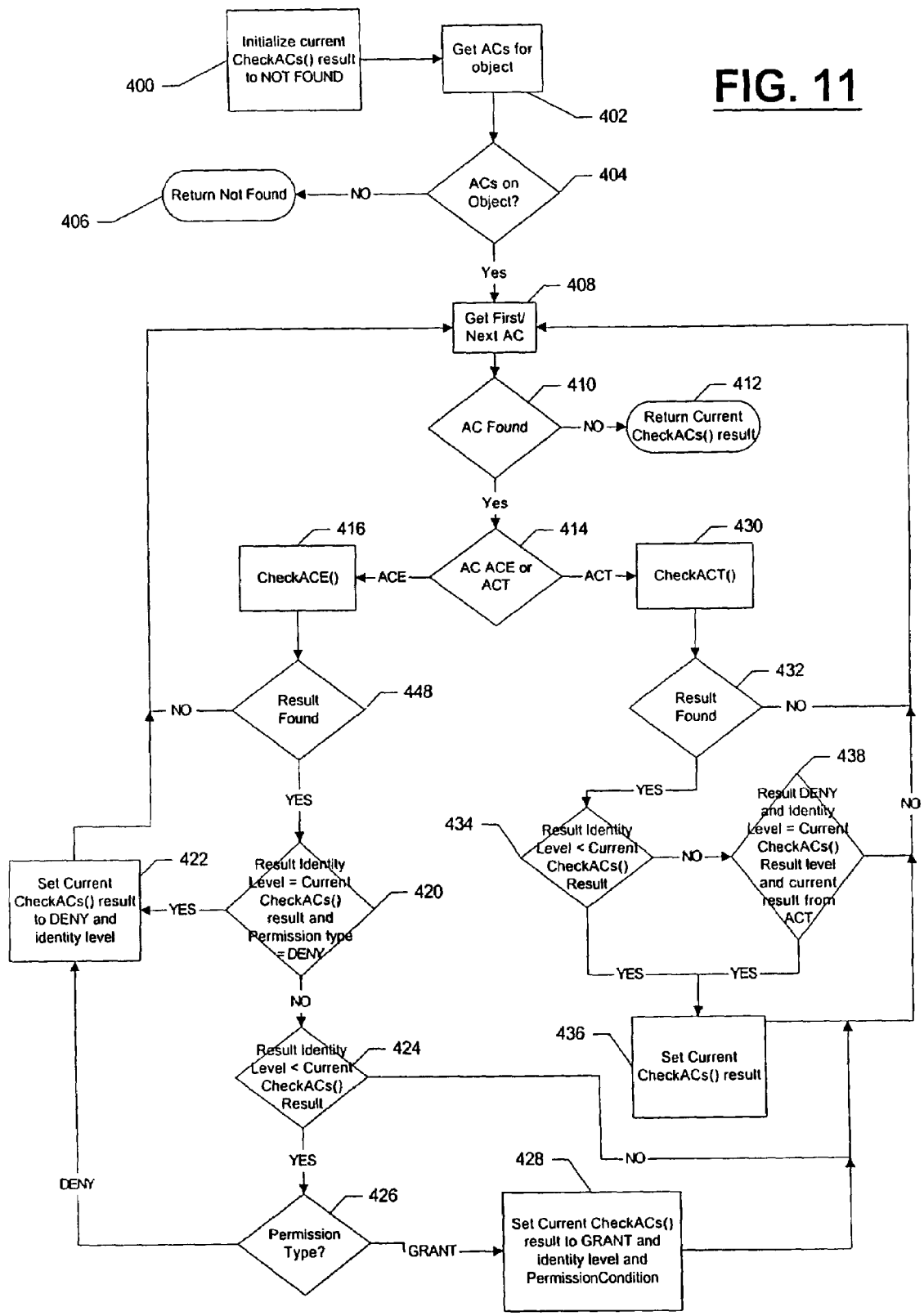

FIG. 11 depicts an operational processing scenario for the CheckACs (check access controls) routine. Process 400 initializes the current routine's result to NOTFOUND. Process 402 obtains access controls for the object. Decision process 404 examines whether there are any access controls on the object. If not, then at 406 a NOTFOUND result is returned. However, if there are access controls on an object, then process 408 obtains the first access control (or next access control depending upon current iteration).

Decision process 410 examines whether an access control has been found. If not, then at 412 the current routine's result is returned. If an access control has been found at decision process 410, then decision process 414 examines whether the access control is a access control entry (ACE) or an access control template (ACT).

Figure 12:
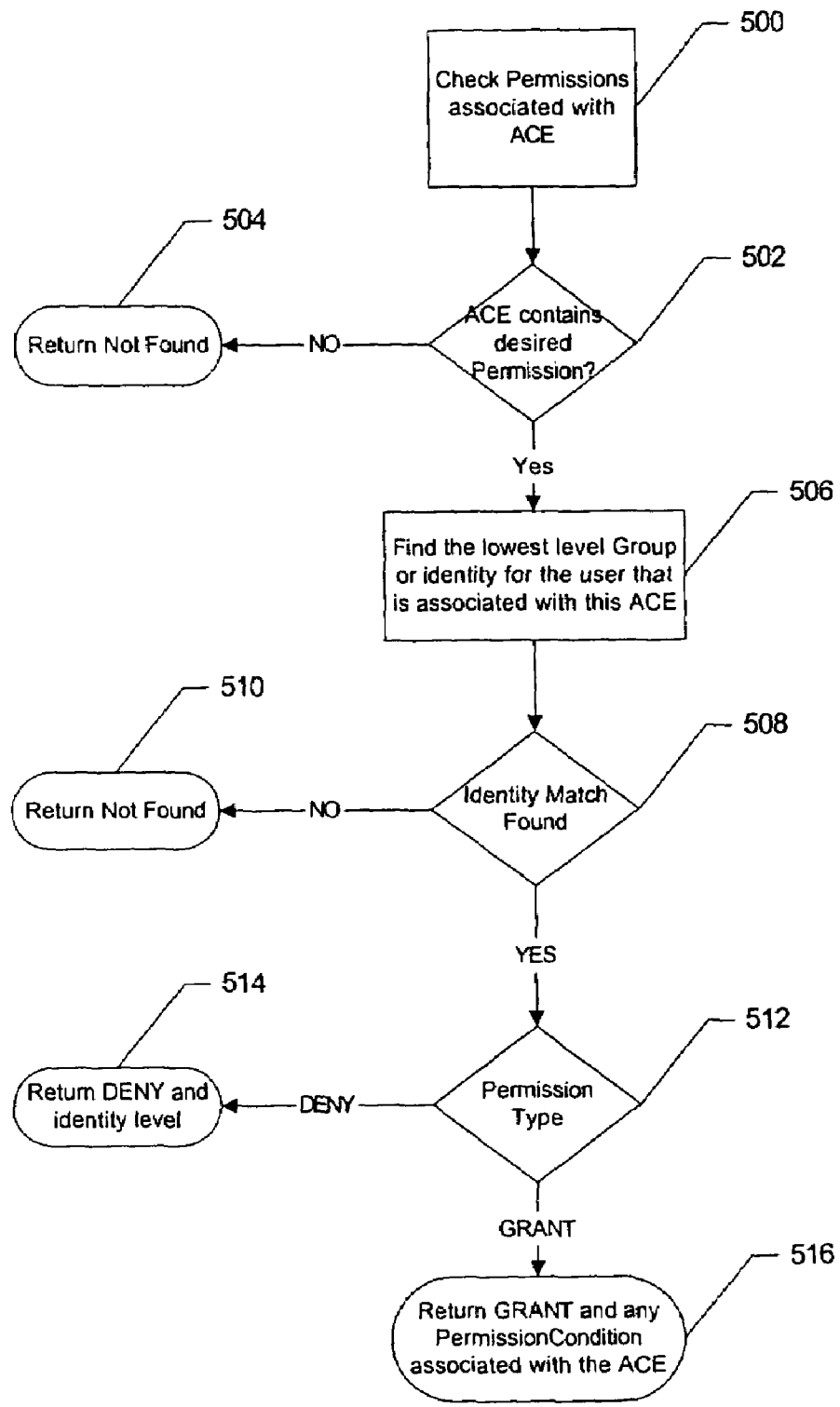

If the access control is an access control entry, then process 416 invokes the CheckACE routine (which is described in FIG. 12). After that routine completes, decision process 418 examines the result returned from the routine. If a result was not found, then processing returns to process 408 where the next access control is processed. However, if a result was found as determined by decision process 418, then decision process 420 examines whether the result identity level is equal to the current check access control routine result and whether the permission type is equal to DENY. This is done in order to help resolve permission conflicts. As an example, if identities are at the same level conflict (e.g., one grants while another denies), then the deny should take precedence (unless configured otherwise). This may occur when one group grants permission and there is also a group that denies the same permission, and both groups are at the same identity level (identity precedence is the same) then precedence will be given to DENY.

If decision process 420 evaluates its condition as true, then process 422 sets the current CheckACs routine's result to DENY with respect to the identity level. If decision process 420 determines the condition in the negative, then decision process 424 examines whether the result identity level is less than the current CheckACs routine's result. If it is not, then processing continues at process 408 wherein the next access control is processed. However, if decision process 424 evaluates the condition as true, then decision process 426 examines the permission type. If the permission type is DENY, then processing continues at process 422. It is noted that when process 422 is entered from decision process 420, then setting the identity level may be optional. However, when process 422 is entered from decision process 426, the identity level is set so that another AC for an identity at a higher level does not override the decision. For example when ACs are being evaluated, the order of the Identities is not always known. So, identity level is checked to see if it has a higher precedence (lower level number) than the identity that has made the "current decision". If an AC with an Identity that has a higher precedence is found, then the process remembers if the AC Granted or Denied, and the process also remembers the level of the identity on that AC. Using this, the process remembers the decision for the identity with the highest precedence.

If the permission type is GRANT, then process 428 sets the current CheckACs routine's result to GRANT as well as to the identity level and permission condition. Processing continues at process 408.

With reference back to decision process 414, if decision process 414 determines that the access control is an access control template, then processing continues at process 430 wherein the CheckACT routine is invoked. (This routine is described in FIG. 13). Decision process 432 evaluates the result from the routine. If a result is not found, then processing continues at process 408. However, if a result is found, then decision process 434 examines whether the result identity level is less than the current CheckACs routine's result. If decision process 434 evaluates that condition in the negative, then decision process 438 is performed. Decision process 438 examines whether the result DENY and identity level equals the current CheckACs routine's result level as well as the current result from the access control template, then process continues at process 436. However, if the condition of decision process 438 is evaluated in the negative, then processing continues at process 408. It is noted that if either of the conditions associated with decision processes 434 and 438 are evaluated as true, then process 436 is performed. Process 436 sets the current CheckACs routine's result before processing continues at process 408.

FIG. 12 depicts an operational scenario involving the CheckACE routine. With reference to FIG. 12, process 500 checks the permissions associated with the access control entry (ACE). Decision process 502 examines whether the access control entry (ACE) contains the desired permission. If it does not, then at 504 a NOTFOUND value is returned. However, if the condition of decision process 502 is evaluated as true, then process 506 finds the lowest level group or identity for the user associated with this access control entry (ACE).

Decision process 508 examines whether an identity match is found. If not, then a NOTFOUND value is returned at 510. However, if the condition associated with decision process 508 is evaluated as true, then decision process 512 examines the permission type. If the permission type is DENY, then at 514 the DENY value is returned as well as the identity level.

However, if the permission type is GRANT, then at 516 a GRANT value is returned and any permission condition associated with the access control entry (ACE) is returned as well.

Figure 13:
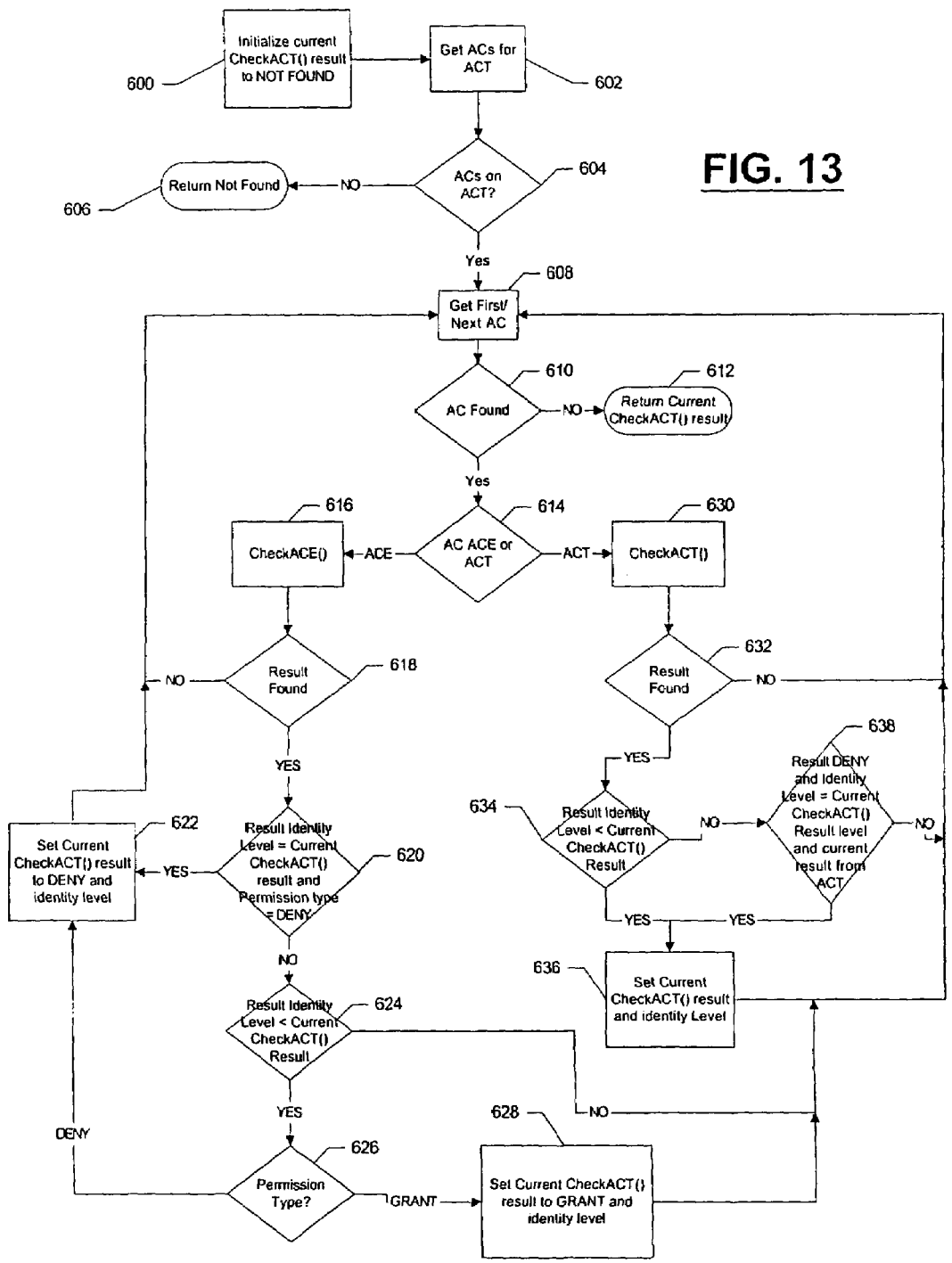

FIG. 13 depicts an operational scenario associated with the CheckACT routine. With reference to FIG. 13, process 600 initializes the current CheckACT routine's result to NOTFOUND. Process 602 obtains the access controls for the access control template.

Decision process 604 examines whether there are access controls with respect to the access control template. If not, then at 606 a NOTFOUND value is returned. However, if there are access controls on an object, then process 608 obtains the first access control (or next access control depending upon current iteration).

Decision process 610 examines whether an access control has been found. If not, then at 612 the current routine's result is returned. If an access control has been found at decision process 610, then decision process 614 examines whether the access control is a access control entry (ACE) or an access control template (ACT).

If the access control is an access control entry, then process 616 invokes the CheckACE routine (which is described in FIG. 12). Decision process 618 examines the result returned from the routine. If a result was not found, then processing returns to process 608 where the next access control is processed. However, if a result was found as determined by decision process 618, then decision process 620 examines whether the result identity level is equal to the current CheckACT routine result and whether the permission type is equal to DENY. If it is, then process 622 sets the current CheckACs routine's result to DENY and to the identity level. However, if decision process 620 determines the condition in the negative, then decision process 624 examines whether the result identity level is less than the current CheckACT routine's result. If it is not, then processing continues at process 608 wherein the next access control is processed.

However, if decision process 624 evaluates the condition as true, then decision process 626 examines the permission type. If the permission type is DENY, then processing continues at process 622. However, if the permission type is GRANT, then process 628 sets the current CheckACs routine's result to GRANT and to the identity level and permission condition. Processing continues at process 608.

With reference back to decision process 614, if decision process 614 determines that the access control is an access control template, then processing continues at process 630 wherein the CheckACT routine is invoked. Decision process 632 evaluates the result from the routine. If a result is not found, then processing continues at process 608. However, if a result is found, then decision process 634 examines whether the result identity level is less than the current CheckACs routine's result. If decision process 634 evaluates that condition in the negative, then decision process 638 is performed. Decision process 638 examines whether the result DENY and identity level equals the current CheckACs routine's result level as well as the current result from the access control template, then process continues at process 636. However, if the condition of decision process 638 is evaluated in the negative, then processing continues at process 608. It is noted that if either of the conditions associated with decision processes 634 and 638 are evaluated as true, then process 636 is performed. Process 636 sets the current CheckACT routine's result and identity level before processing continues at process 608.

FIG. 14 depicts an operational scenario involving the Check Inherited Permissions routine. The operational scenario uses rules to determine parent objects and to see if they grant or deny the user the specific permission. With reference to FIG. 14, process 700 obtains the rules for this object's class and adds them to the list of rules to process. Decision process 702 examines whether an ignore superclass rule has been found. In this example, the ignore superclass rule prevents using the rules above the class, while the rules for the class are still used. If an ignore superclass rule is found, then processing continues at decision process 704.

However, if decision process 702 determines that there is not an ignore superclass rule, then processing continues at decision process 706. Decision process 706 examines whether a superclass exists. If a superclass does not exist, then processing continues at decision process 704. However, if a superclass does exist as determined by decision process 706, then process 708 adds the authorization rules of the superclass to the rules list. Decision process 710 examines whether an ignore superclass rule was found with respect to the newly added rules. If such a rule is not found as determined by decision process 710, then processing continues at decision process 706. However, if such a rule is found as determined by decision process 710, then decision process 704 is executed.

Decision process 704 examines whether any object is found with any security rule. If not, then at 714 a NOTFOUND value is returned. However, if the condition associated with decision process 704 is evaluated as true, then process 715 invokes the Check Authorization routine (of FIG. 10) for each object referenced by a rule in the rules list. After process 715 completes, decision process 716 examines whether the Check Authorization routine returns true for any objects. If it does, then at 718, a true value is returned. However, if the condition associated with decision process 716 is evaluated as false, then at 720 a false value is returned.

It should be understood that the steps and the order of the steps in the flowcharts contained herein may be altered, modified and/or augmented and still achieve the desired outcome. For example, the operational scenario may include stopping the check objects and return a true value as soon as process 715's Check Authorization routine returns a true value.

Figure 15:
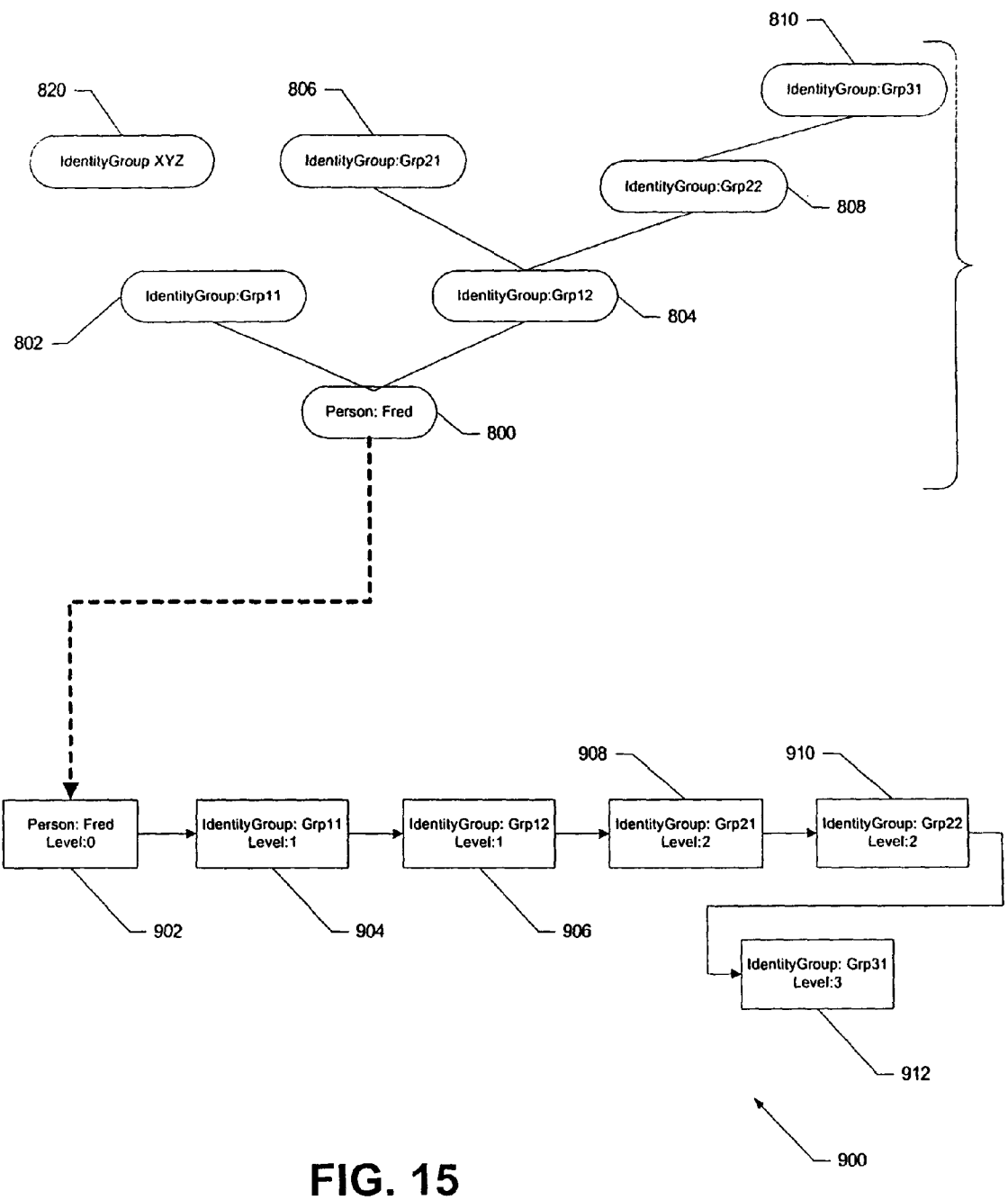
FIG. 15 depicts a block diagram wherein multiple parent authorization conflicts are resolved.

FIG. 15 shows an example of resolving authorization conflicts that my arise when an object's parents generate conflicting permissions. In this example, the person Fred 800 is a member of the Grp11, Grp12, Grp21, Grp22, and Grp31 IdentityGroups (802, 804, 806, 808, 810). Note that the person FRED 800 is not a member of the XYZ identityGroup 820.

When an authorization decision is being made, a credentials list 900 is built which starts with the requesting user's primary identity 902 and includes all the groups to which the user is directly and indirectly a member 904, 906, 908, 910, 912). As this list is built, a "level" is determined for each identity on the credential list.

The "level number" in the boxes above indicate "level" or "hops" between the user and a particular group. When evaluating ACs on an object, these levels are used to determine the precedence of a GRANT or DENY when more than one of the user's identities are granted or denied a permission.

Figure 16:
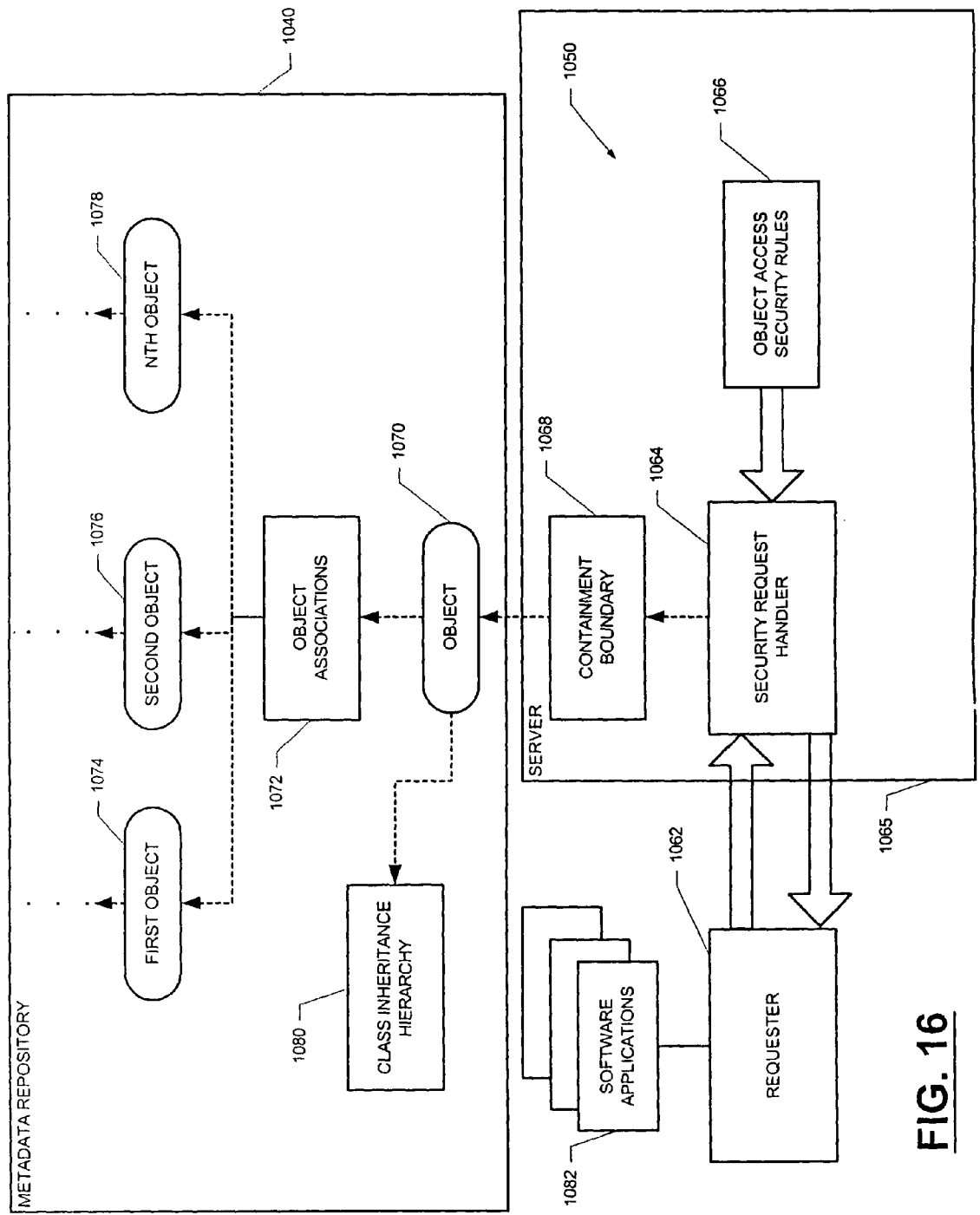
FIGS. 16 and 17 depict block diagrams of metadata repositories using a data access security system.

Situations involving multiple parents and multiple associations may arise in many different contexts. A metadata repository context is just one example. In the example of FIG. 16, a metadata repository 1040 stores information about the data resources in an organization. Object 1070 of the metadata repository 1040 has multiple parents in the class inheritance hierarchy 1080 and multiple object associations 1072. The objects (1070, 1074, 1076, 1078) in the metadata repository 1040 do not have a hierarchical name scheme, and are not autonomous objects. The metadata repository 1040 acts as an object database.

The metadata repository 1040 may be used to lessen the impact of integrating software into an enterprise. The metadata stored in the repository 1040 describes all or most aspects of an enterprise including infrastructure, processes, data, and people. To facilitate the use of this metadata, the metadata repository 1040 provides an object model that can be used to fully describe the computing resources/processes of an enterprise.

In this example, the metadata repository 1040 allows all enterprise computing resources to be registered in a single location and accessed by multiple individuals. In addition, software applications 1082 are able to provide and consume information from/to the metadata repository 1040, thereby automating the maintenance of the metadata and minimizing the efforts required to integrate new products into the enterprise environment. The applications 1082 themselves may vary greatly, such as applications used in connection with data mining and data warehousing situations.

The metadata repository 1040 contains information that is sensitive and to which access should be controlled. A data access security system 1050 provides an authorization facility which is used by the metadata repository 1040 to control who can access (and how they can access) the various objects in the metadata repository 1040. In addition, the software applications 1082 may need to perform some form of authorization checks prior to allowing individuals access to the real data or processes in the enterprise infrastructure.

A security request handler 1064 operating on server 1065 receives a request and examines whether the requester 1062 should be granted access to all or any of the requested information as well as what kinds of operations the requester 1062 may perform on that information. The security request handler 1064 processes the request by constructing a containment boundary 1068 around the relevant objects. In this example, both object association-based rules and class inheritance hierarchy-based rules (i.e., security rules 1066) are used in forming the containment boundary 1068.

Because the metadata model in the repository 1040 can be used to represent all aspects of the enterprise infrastructure, the repository's authorization facility may be made accessible to other applications. A centralized authorization facility may be provided that is based on common enterprise metadata and shared by applications in the enterprise. In this example regardless of the application or the administration tool used, the authorization decisions rendered for a resource is consistent for an individual across applications; and there is no need (unless desired) to administer authorization for a user to a resource in each application. Once the authorization has been defined for a user on a resource, it is applicable across all applications. It is noted that rules can vary from repository to repository.

Figure 17:
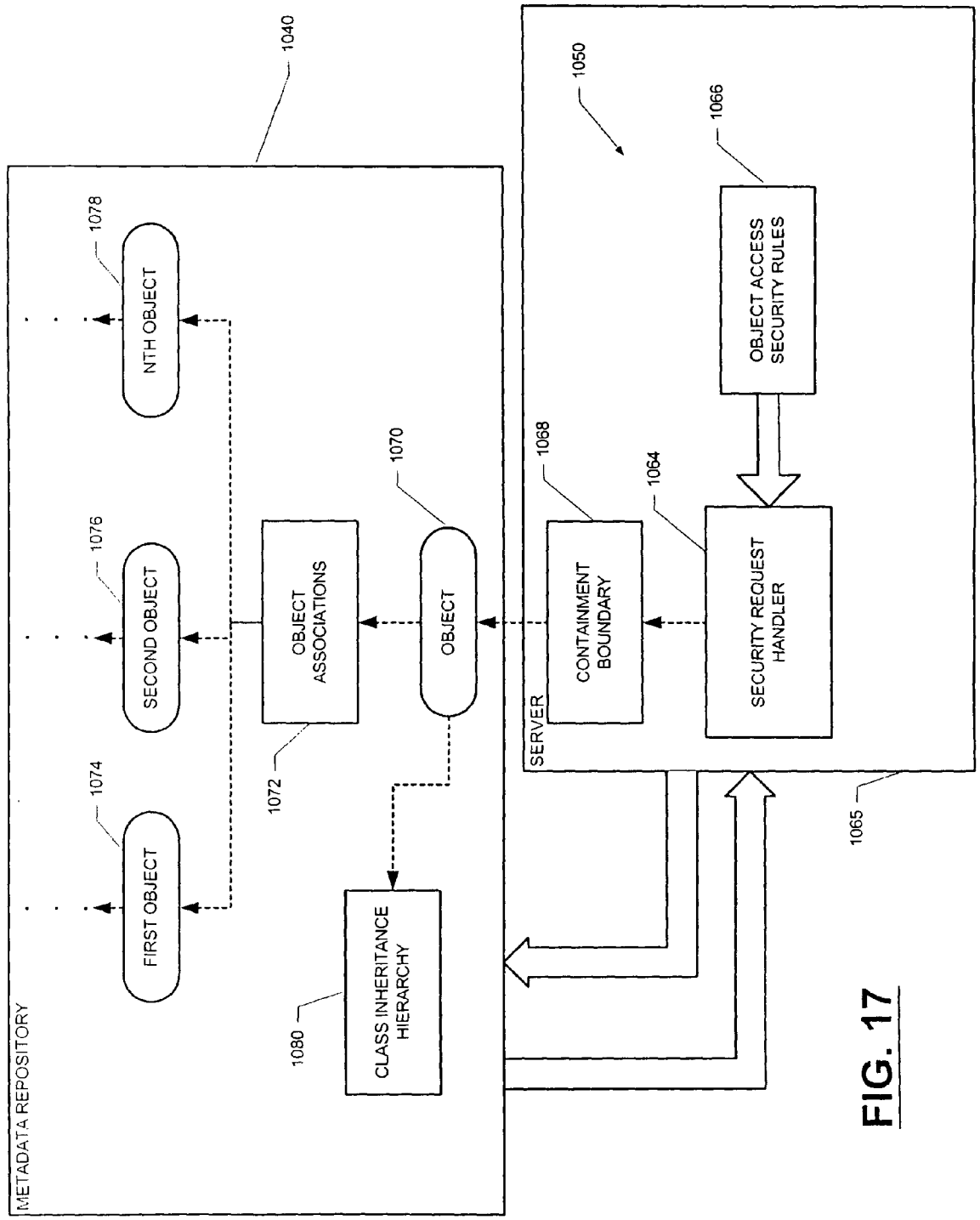

FIG. 17 illustrates that the requester of an object may come from a metadata repository itself. It is noted that multiple metadata repositories may be accessing the security request handler 1064. The security request handler 1064 may use different rules depending upon the metadata repository that is involved. Also, the security request handler 1064 may be remotely accessible via a LAN, Intranet, WAN, or Internet connection. It may also reside on the same server as a metadata repository.

EXAMPLE METADATA REPOSITORY CLASSES AND ASSOCIATIONS

The following describes various metadata classes and associations to define security settings for metadata repository objects. The metadata classes may be expanded or narrowed depending upon the situation at hand. It is noted that the metadata repository has many associations in its object model, and the security rules select which ones are relevant to the security access issue.

In an example metadata repository, the access control class is an abstract class that is extended by other classes, such as the access control template and access control entry classes. The access control entry class (ACE) specifies whether the system should grant or deny one or more identities access to a specific requested object. The ACE class can also be used to specify what kinds of activities an identity can perform on the requested object. For example, an administrator may want all employees to be able to read, but not modify the names of the employees listed in a table. The administrator may create an ACE object to give the AllEmployees:IdentityGroup read access to Name:Column objects. It is noted that the aforementioned object instances (e.g., AllEmployees:IdentityGroup) follow the format "Object:Class Name".

The access control template class (ACT) serves as an access control pattern that can be reused and associated with many objects. An ACT may use other ACTs and access control entries for its definition. ACTs may be named and generally visible to users when they are defining security on resources.

An identity class is an abstract type that represents entities or groups of entities that can request access to a resource object. An identity class can contain one or more login objects.

An identity group represents a group of identities. For example a group could represent an organizational group like a department, or perhaps a role like "HR Administrators". As a sub-class of identity, an identity group may have a login associated directly with it, thus providing a way for a group of users to share a login.

The login class represents a username and password that is used to access other resource. The user name is also used to tie a metadata identity to an authenticated user.

A permission class is used to describe the action an identity object can be granted or denied with respect to a resource object. For each action that can be performed in this example, there should be only one permission, which can be shared by any ACEs that need it. Because permissions are metadata objects, new permissions can be added to the authorization facility as needed. If a new application needs a new permission, the application can be deployed against an existing metadata repository by simply adding a new permission object to the metadata repository.

A permission condition class qualifies the circumstances under which an identity may access a request object. For example in an employee database, the permission condition might specify that a human resources employee may modify the job title only of a specific employee whose manager has given approval of the change.

A person class represents a person and their associated information such as name, address, phone number, and email address. Because persons are identity objects, they also have logins.

A security rule class represents the different types of security rules for accessing resources. A security rule scheme class represents a collection of security rules that can be treated as a unit. A security type containment rule class represents a type of rule that is used to determine the parentage of objects based on their class type and associated objects.

A ServerComponent class represents a data server. A Library class represents a collection of files, data tables, etc.

A Tree class represents an object that establishes a hierarchy and/or navigational scheme. A PhysicalTable class represents rectangular data.

METADATA REPOSITORY EXAMPLE

Figure 18:
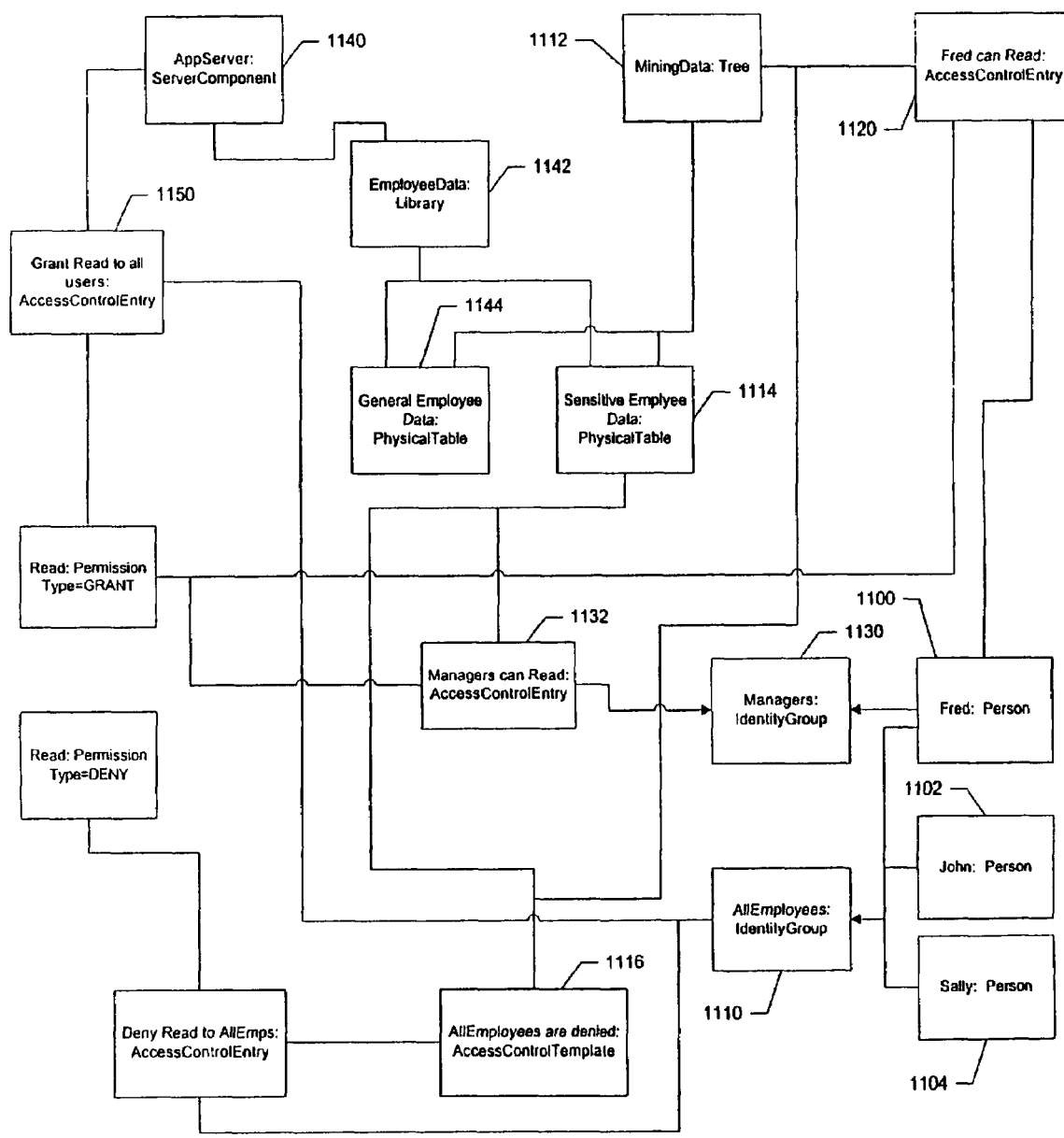
FIG. 18 is a UML (Unified Modeling Language) diagram depicting an example using a data access security system.

FIG. 18 illustrates an example of different identities attempting to access resource objects in an employee database. Within the UML (Unified Modeling Language) diagrams of FIG. 18, the following convention is used to represent an instance of a class: "Object:Class Name".

In this example, person Fred 1100, person John 1102, and person Sally 1104 attempt to access various data stored in tables on an application server. Access control templates, access control entries, and permissions are used to determine what data the persons may access.

In general, the "AllEmployees: Identity Group" 1110 is denied read access on the "Mining Data: Tree" 1112 and "Sensitive Employee Data: PhysicalTable" 1114 due to the "AllEmployees are denied: AccessControlTemplate" 1116. However, Person Fred 1100 can read the "Mining Data: Tree" 1112 because "Fred can Read: AccessControlEntry" 1120 has higher precedence than the ACT 1116 that denies all Employees.

"Manager: IdentityGroup" 1130 can read the "Sensitive Employee Data: PhysicalTable" 1114 because "Managers can Read: AccessControlEntry" 1132 has higher precedence than the ACT 1116 that denies all Employees.

Person John 1102 and person Sally 1104 can read "AppServer: ServerComponent" 1140, "EmployeeData: Library" 1142, "General Employee Data: PhysicalTable" 1144 because the read permission 1150 is granted on "AppServer: ServerComponent" 1140 and inherited via its security rules through the library 1142 down to the table (e.g., data table 1144).

"GeneralEmployee Data: PhysicalTable" 1144 inherits authorizations from both "EmployeeData: Library" 1142 and "Mining Data: Tree" 1112. During evaluation of authorizations form person John 1102 and person Sally 1104, the data table 1144 inherits a grant from the library 1142, but also inherits a deny from the "Mining Data: Tree" 1112. Because one of the PhysicalTable's parents granted the permission, the permission is granted on the physical table 1144.

Person John 1102 and person Sally 1104 cannot read the "Sensitive Employee Data: Physical table" 1114 because the "AllEmployees are denied: AccessControlTemplate" 1116 denies all employees access to the PhysicalTable 1114, except for the "Managers: IdentityGroup" 1130 which are explicitly granted access to physical table via the AccessControlEntry 1132.

While examples have been used to disclose the invention, including the best mode, and also to enable any person skilled in the art to make and use the invention, the patentable scope of the invention is defined by the claims, and may include other examples that occur to those skilled in the art. As an example of the wide scope and variations of the systems and methods disclosed herein, FIG. 19 shows a user interface 1200 being used to edit the object access security rules. The interface 1200 may be an XML (eXtensible Markup Language) oriented interface which is used to surface the rules hierarchy of objects. The interface may display the rules in a number of different formats, such as returning the objects in a tree format based upon the objects' associations 72.

Still further, the system and method disclosed herein may be used to allow the security to change as the resources go through various cycles of life:

1) In a development environment when dealing with a new set of resources, there may be no security or security only at the repository level, e.g., only the developers have access.

2) As the set of resources becomes more entrenched after development, the object access security rules may be honed so that administrators are not overwhelmed by the granular administration of resources at the object level (because of the frequency of changes/additions), but to still give them lower level control.

3) As the resources move into production, performance becomes more important and changes are less likely. In this case, the security information can be compiled so that it does not have to be regenerated upon each request.

Still further, the disclosed system and method may be used to only secure certain "key" objects, either because that is the only point of entry that their application surfaces or because they are seen as the key objects that stop the user from going further. As another example, if it is desired to only allow access to reports from the application, the system and method might be designed to only secure the individual reports. Thus, user access to the applications is controlled.

Still further, the disclosed system and method may be grant biased or deny biased. For example, if there are three objects associated with a resource object and one of the objects grants permission while the other two deny permission, then a grant biased system and method will generate a grant permission. A deny biased system and method would generate a deny permission in that situation.

It is further noted that systems and methods disclosed herein may be implemented on various types of computer architectures, such as for example on a single general purpose computer or workstation, or on a network (e.g., local area network, wide area network, or internet), or in a client-server configuration, or in an application service provider configuration. In multiple computer systems, data signals may be conveyed via fiber optic medium, carrier waves, wireless networks, etc. for communication among computers or computing devices. Also, the systems' and methods' data may be stored as one or more data structures in computer memory depending upon the application at hand. The systems and methods may be provided on many different types of computer readable media including instructions being executable by a computer to perform the system and method operations described herein.

It is claimed as the invention:

1. A computer-implemented method for accessing resource objects that are stored in an object database, comprising the steps of:

receiving a request from a requestor which involves accessing a resource object that is stored in the object database;

wherein the requested resource object has multiple associations with other objects that are stored in the object database;

wherein the multiple associations with said other objects comprise a network of object associations that establish the requested resource objects having multiple parents;

evaluating identity of the requestor with respect to access controls placed on the requested resource object for establishing an authorization decision with respect to the resource object;

wherein if the examining of the requestor's identity with respect to the resource object access controls does not result in establishing an authorization decision, then:

evaluating container objects, which are the parents of the requested object, within a security containment boundary for establishing an authorization decision with respect to the resource object;

wherein security containment rules are security rules that specify which associations form the security containment boundary for objects based on object class;

wherein the associations specified by the security containment rules are used to determine which of the multiple associated objects, that are parents of the requested object, form the security containment boundary;

wherein the request to the resource object is processed based upon security access control information associated with the container objects contained within the determined security containment boundary.

2. The method of claim 1 wherein the resource objects access information stored in a database.

3. The method of claim 1 wherein the resource objects access information stored in a metadata repository.

4. The method of claim 1 wherein an association defines a relationship between an instance of one object class and an instance of another object class.

5. The method of claim 4 wherein at least one association includes a relationship between the requested resource object and a object which is a container object for the requested resource object, wherein the object is a container object based upon the security rules.

6. The method of claim 5 wherein the multiple associations include relationships between the requested resource object and its container objects.

7. The method of claim 5 wherein based upon the resource object's physical container and class type, security rules specify different layers of containment with respect to the requested resource object.

8. The method of claim 7 wherein the layers of containment include different levels of access security granularity with respect to the requested resource object.

9. The method of claim 7 wherein the layers of containment include different levels of access security granularity with respect to the requested resource object and its associated objects.

10. The method of claim 1 wherein security rules are retrieved based upon the requested resource object's class type.

11. The method of claim 1 wherein a computer program provides the request.

12. The method of claim 1 wherein a human user using a computer program provides the request.

13. The method of claim 1 wherein the security containment boundary determines which requesters can have access to the resource objects contained within the boundary.

14. The method of claim 13 wherein the security containment boundary is established for the requested resource object by setting up security rules based on object class.

15. The method of claim 14 wherein the security rules specify how to traverse from an object of a class to an associated object, wherein authorization information determined from the traversal is used to determine whether access is to be granted to the requested resource object, wherein identity of the requester is used in determining whether access is to be granted to the requested resource object.

16. The method of claim 1 wherein access control decision for the resource object is determined based upon the resource objects' association with a plurality of associated objects.

17. The method of claim 1 wherein access control decision for the resource object is determined based upon the resource objects' association with a plurality of objects, wherein security access control information of the associated objects is used to form the access control decision, wherein the association with the plurality of object includes both objects directly associated with the requested resource object and object indirectly associated with the requested resource object.

18. The method of claim 17 wherein the access control decision involves whether to grant access to the requested resource object.

19. The method of claim 1 wherein security rules related to the requested resource object include at least one security rule inherited from the resource object's one or more ancestor classes, wherein security access control information associated with at least one of the resource object's one or more ancestor classes is used to determine authorization with respect to the resource object.

20. The method of claim 19 wherein the ancestor classes are classes from a class inheritance hierarchy.

21. The method of claim 20 further comprising the step of:
determining for the requested resource object from which security rules to inherit based upon parents of the requested resource object as specified in the class inheritance hierarchy.

22. The method of claim 21 wherein the security rules are defined once on a parent class and affect all of its child classes with respect to object access determinations.

23. The method of claim 22 wherein child classes augment security rules inherited from their parents.

24. The method of claim 23 wherein at least one child class ignores one or more of the inheritable security rules from its one or more ancestor classes.

25. The method of claim 23 wherein a security rule specifies that at least one child class ignores one or more of the inheritable security rules from its one or more ancestor classes.

26. The method of claim 1 wherein a permission is involved with the request, wherein security access control information is used to determine whether the permission sought by the requester is to be granted.

27. The method of claim 1 wherein the requested resource object has an association with a first object whose security access control information denies access, wherein the requested resource object has an association with a second object whose security access control information grants access, wherein access to the resource object is granted based upon the second object's security access control information.

28. The method of claim 27 wherein the first object has an association to the requested resource object through another object.

29. The method of claim 27 wherein the second object has an association to the requested resource object through another object.

30. The method of claim 1 wherein hops between a requesting user and a particular group is used in evaluating whether access is to be granted on the resource object.

31. The method of claim 1 wherein the requested resource object has an association with a first object whose security access control information denies access and has an association with a second object whose security access control information grants access, wherein access to the resource object is denied based upon the first object's security access control information.

32. The method of claim 1 wherein the request to the resource object is processed based upon the determined security containment boundary so as to determine whether to grant a requester access to the requested resource object.

33. The method of claim 32 wherein processing the request to the resource object includes determining whether a requested operation may be performed by the requester on the requested resource object.

34. The method of claim 1 wherein results of a processed request is stored in cache for processing a subsequent request.

35. The method of claim 1 wherein a user interface is used to edit the security rules.

36. The method of claim 35 wherein the user interface has an eXtensible Markup Language facility in order to provide the editing of the security rules.

37. A computer-implemented apparatus for accessing a resource object that is stored in an object database in response to a request from a requestor, wherein the resource objects have multiple associations with other objects that are stored in the object database, comprising:
   a storage mechanism to store security containment rules which are used in determining whether access is to be granted to resource objects that are stored in the object database;
   wherein the multiple associations with said other objects comprise a network of object associations that establish the requested resource objects having multiple parents;
   a security request handler with a data access pathway to the security rules and which evaluates identity of the requestor with respect to access controls placed on the requested resource object for establishing an authorization decision with respect to the resource object;
   wherein if the examining of the requestor's identity with respect to the resource object access controls does not result in establishing an authorization decision, then the security request handler is configured to:
      evaluate container objects, which are the parents of the requested object, within a security containment boundary for establishing an authorization decision with respect to the resource object;
      wherein security containment rules specify which associations form the security containment boundary for objects based on object class;
      wherein the associations specified by the security containment rules are used to determine which of the multiple associated objects, that are parents of their requested object, form the security containment boundary;
   wherein the request to the resource object is processed based upon the specified security containment rules.

38. The apparatus of claim 37 wherein at least one security containment rule determines access to the requested resource object based upon inheritance class hierarchy involving the requested resource object.

39. A computer-implemented method for accessing resource objects that are stored in an object database, wherein the resource objects have multiple associations with other objects that are stored in the object database, comprising the steps of:
   receiving a request from a requestor which involves accessing a resource object that is stored in the object database;
   wherein the multiple associations with said other objects comprise a network of object associations that establish the requested resource objects having multiple parents;
   evaluating identity of the requestor with respect to access controls placed on the requested resource object for establishing an authorization decision with respect to the resource object;
   wherein if the examining of the requestor's identity with respect to the resource object access controls does not result in establishing an authorization decision, then:
      evaluating container objects, which are the parents of the requested object, within a security containment boundary for establishing an authorization decision with respect to the resource object;
      wherein security containment rules specify which associations form the security containment boundary for objects based on object class;
      wherein the associations specified by the security containment rules are used to determine which of the multiple associated objects, that are parents of the requested object, form the security containment boundary;
   wherein the request to the resource object is processed based upon the determined security containment boundary;
   wherein based upon the resource object's physical container and class type, the security containment rules specify different layers of containment with respect to the requested resource object.

40. A computer-implemented apparatus for accessing resource objects that are stored in an object database, comprising:
   means for receiving a request from a requestor which involves accessing a resource object that is stored in the object database;
   wherein the requested resource object has multiple associations with other objects that are stored in the object database;
   wherein the multiple associations with said other objects comprise a network of object associations that establish the requested resource objects having multiple parents;
   means for evaluating identity of the requestor with respect to access controls placed on the requested resource object for establishing an authorization decision with respect to the resource object;
   means for evaluating container objects, which are the parents of the requested object, within a security containment boundary for establishing an authorization decision with respect to the resource object if the examining of the requestor's identity with respect to the resource object access controls does not result in establishing an authorization decision;
   wherein security containment rules specify which associations form the security containment boundary for objects based on object class;
   wherein the associations specified by the security containment rules are used to determine which of the multiple associated objects, that are parents of the requested object, form the security containment boundary;
   wherein the request to the resource object is processed based upon the security containment boundary.

41. A computer-implemented method for accessing resource objects that are stored in an object database, comprising the steps of:

receiving a request from a requestor which involves accessing a resource object that is stored in the object database;

wherein the requested resource object has multiple associations with other objects that are stored in the object database;

wherein the multiple associations with said other objects comprise a network of object associations that establish the requested resource objects having multiple parents;

evaluating identity of the requestor with respect to access controls placed on the requested resource object for establishing an authorization decision with respect to the resource object;

evaluating security rules to determine whether to grant access to the requested resource object;

wherein the security rules include security containment rules and security authorization rules;

wherein the security containment rules are used to determine a security containment boundary with respect to the requested resource object based upon associations which the requested resource object has with other objects;

wherein the request to the resource object is processed based upon the security authorization rules associated with the objects, which are the parents of the resource object, contained within the determined security containment boundary.

* * * * *